(12) United States Patent
Shimoda et al.

(10) Patent No.: US 7,114,864 B2
(45) Date of Patent: Oct. 3, 2006

(54) ELECTRONIC PAPER PRINTER

(75) Inventors: Tatsuya Shimoda, Suwa (JP); Satoshi Inoue, Suwa (JP)

(73) Assignee: Seiko Epson Corporation, (JP)

( * ) Notice: Subject to any disclaimer, the term of this patent is extended or adjusted under 35 U.S.C. 154(b) by 0 days.

(21) Appl. No.: 10/891,254

(22) Filed: Jul. 14, 2004

(65) Prior Publication Data

US 2004/0247360 A1 Dec. 9, 2004

Related U.S. Application Data

(63) Continuation of application No. 09/422,378, filed on Oct. 21, 1999, now abandoned.

(30) Foreign Application Priority Data

Oct. 22, 1998 (JP) .............................. 10-301512

(51) Int. Cl.
 *B41J 2/39* (2006.01)
(52) U.S. Cl. .................. 400/76; 347/141; 347/147; 345/107; 430/37; 430/38; 359/296
(58) Field of Classification Search ................ 347/111, 347/112, 120, 123, 141, 142, 145, 146, 147, 347/148, 159; 400/76; 345/107; 430/37, 430/38; 359/296
See application file for complete search history.

(56) References Cited

U.S. PATENT DOCUMENTS

| | | | |
|---|---|---|---|
| 4,748,464 A * | 5/1988 | Pannekoek et al. ......... 347/141 |
| 5,065,171 A | 11/1991 | Miyake et al. |
| 5,389,945 A | 2/1995 | Sheridon |
| 5,640,189 A | 6/1997 | Ohno et al. |
| 5,723,204 A | 3/1998 | Stefik |
| 5,866,284 A | 2/1999 | Vincent |
| 5,961,804 A | 10/1999 | Jacobson et al. |
| 6,064,410 A | 5/2000 | Wen et al. |
| 6,100,909 A | 8/2000 | Haas et al. |
| 6,177,947 B1 | 1/2001 | Wen et al. |
| 6,795,101 B1 * | 9/2004 | Van Der Meer et al. ... 347/142 |

FOREIGN PATENT DOCUMENTS

CA 2283752 3/1998

(Continued)

OTHER PUBLICATIONS

P. Drzaic, et al. "A Printed and Rollable Bistable Electronic Display", MIT Media Laboratory, Cambridge, MA (344.3L).
Barrett Comiskey, et al. "An electrophoretic ink for all-printed reflective electronic displays", Nature (vol. 394, Jul. 16, 1998).

(Continued)

*Primary Examiner*—Andrew H. Hirshfeld
*Assistant Examiner*—Kevin D. Williams
(74) *Attorney, Agent, or Firm*—Harness, Dickey & Pierce, P.L.C.

(57) ABSTRACT

An electronic paper printer is provided that is capable of describing display patterns properly and definitely on rewritable electronic paper. An electronic paper printer 1 has a describing head 3 for describing display patterns on electronic paper 2 capable of having display patterns rewritten thereto and erased therefrom, using electrophoresis, an erasing head 4 for erasing display patterns described on the electronic paper 2, a drive mechanism (not shown) for driving the describing head 3 and the erasing head 4 so that they turn, and a conveyor mechanism (not shown) for conveying the electronic paper 2. The describing head 3 is configured by a pair of drums 31 and 32 supported so that they freely turn. The erasing head 4 is configured by a pair of drums 41 and 42 supported so that they freely turn.

8 Claims, 16 Drawing Sheets

FOREIGN PATENT DOCUMENTS

| | | |
|---|---|---|
| EP | 0 427 507 A2 | 11/1990 |
| EP | 0721 176 A2 | 7/1996 |
| EP | 0940 261 A1 | 9/1999 |
| JP | 52-044197 | 4/1977 |
| JP | 54-068238 | 6/1979 |
| JP | 61-115649 | 7/1986 |
| JP | 62-38626 | 3/1987 |
| JP | 62-149024 | 9/1987 |
| JP | 3-188489 | 8/1991 |
| WO | WO 98/54690 | 12/1998 |

OTHER PUBLICATIONS

H. Kawai, et al., "Microencapsulated Electrophoretic Rewritable Sheet", NOK Corp., Kanagawa, Japan (53.3).

SID 97 DIGEST, pp. 75 & 76, B Comiskey, et al., "Electrophoretic Ink: A Printable Display Material", MIT Media Laboratory, Cambridge, MA (7.4L), May 13, 1997.

Communication from China re counterpart application No. 99121871.X.

Communication from Korean Patent Office re: related application.

Communication from Japanese Patent Office re: related application.

* cited by examiner

ELECTRONIC PAPER PRINTER

RELATED APPLICATIONS

This application is a continuation of U.S. Ser. No. 09/422,378 filed Oct. 21, 1999 now abandoned which claims priority to JP 10-301512 filed Oct. 22, 1998, the contents of which are both incorporated by reference herein in their entireties.

BACKGROUND OF THE INVENTION

1. Field of the Invention

This invention relates to a printer for electronic paper.

2. Description of the Related Art

A segmented type of electrophoretic display is known (Barrett Comiskey, Jonathan D. Albert, and Joe Jacobson, "Electrophoretic Ink: A printable display material," Proceedings of SID 97 in Boston (1997)).

In such an electrophoretic display, segments in the display are configured by a plurality of micro-capsules that employ electrophoresis, such that, by applying a voltage to a target segment, the color of that segment changes, either partially or entirely.

However, there has not been an electronic paper printer for describing display patterns on rewritable electronic paper wherein the electrophoresis noted above is used.

SUMMARY OF THE INVENTION

An object of the present invention is to provide an electronic paper printer capable of describing display patterns properly and definitely on rewritable electronic paper.

Such an object is realized by the inventions described below in (1) to (26).

(1) An electronic paper printer for describing display patterns on electronic paper, comprising: a plurality of capsules inside of which charged particles move, whereby colors are changed and display patterns are displayed; and a head for describing display patterns on the electronic paper; wherein: the charged particles inside the capsules are caused to move by applying an electric field to the electronic paper; and the portion of the head which contacts the electronic paper is given a curved shape.

(2) The electronic paper printer described above in (1), wherein the head is configured by at least a pair of drums.

(3) The electronic paper printer described above in (2), wherein at least one drum of the pair of drums has, on the outer circumferential surface thereof, a plurality of pixel electrodes that form electric fields that are applied to the electronic paper.

(4) The electronic paper printer described above in (2), wherein one drum of the pair of drums has, on the outer circumferential surface thereof, a plurality of pixel electrodes that form electric fields that are applied to the electronic paper, and the other drum thereof has, on the outer circumferential surface thereof, a common electrode that forms the electric fields together with the pixel electrodes.

(5) The electronic paper printer described above in (3) or (4), wherein the plurality of pixel electrodes is deployed in a matrix arrangement.

(6) The electronic paper printer described above in (3), (4), or (5), having a plurality of switching elements that can switch between forming and extinguishing the electric fields produced by the plurality of pixel electrodes.

(7) The electronic paper printer described above in (6), wherein the switching elements are thin film transistors.

(8) An electronic paper printer for describing display patterns on electronic paper, comprising: a plurality of capsules inside of which charged particles move, whereby colors are changed and display patterns are displayed; and a drum-shaped head for describing display patterns on the electronic paper; wherein: the charged particles inside the capsules are caused to move by applying an electric field to the electronic paper; and the configuration is such that the display patterns are described by patterns applied from the head to the electronic paper.

(9) The electronic paper printer described above in any one of inventions (1) to (8), wherein the head has an erasing head for erasing display patterns described on the electronic paper and a describing head for describing display patterns on the electronic paper.

(10) The electronic paper printer described above in any one of inventions (1) to (8), wherein the head is configured so that overwriting is possible.

(11) An electronic paper printer for describing display patterns on electronic paper, comprising: a plurality of capsules inside of which charged particles move, whereby colors are changed and display patterns are displayed; a describing head for describing display patterns on the electronic paper; and an erasing head for erasing display patterns described on the electronic paper; wherein: the portion or portions of the describing head and/or the erasing head that contact the electronic paper are given a curved shape.

(12) The electronic paper printer described above in (11), wherein the erasing head is configured by a pair of drums having a single electrode on the outer circumferential surfaces thereof.

(13) The electronic paper printer described above in (11), wherein at least one head of the describing head and the erasing head is configured by a pair of drums.

(14) The electronic paper printer described above in (13), wherein at least one drum of the pair of drums has, on the outer circumferential surface thereof, a plurality of pixel electrodes that form electric fields that are applied to the electronic paper.

(15) The electronic paper printer described above in (13), wherein one drum of the pair of drums has, on the outer circumferential surface thereof, a plurality of pixel electrodes that form electric fields that are applied to the electronic paper, and the other drum thereof has, on the outer circumferential surface thereof, a common electrode that forms the electric fields together with the pixel electrodes.

(16) The electronic paper printer described above in (14) or (15), wherein the plurality of pixel electrodes is deployed in a matrix arrangement.

(17) The electronic paper printer described above in (14), (15), or (16), having a plurality of switching elements that can switch between forming and extinguishing the electric fields produced by the plurality of pixel electrodes.

(18) The electronic paper printer described above in (17), wherein the switching elements are thin film transistors.

(19) An electronic paper printer for describing display patterns on electronic paper, comprising: a plurality of capsules inside of which charged particles move, whereby colors are changed and display patterns are displayed; and an overwrite-capable head for describing display patterns on the electronic paper; wherein: the charged particles inside the capsules are caused to move by applying an electric field to the electronic paper; and the portion of the head which contacts the electronic paper is given a curved shape.

(20) The electronic paper printer described above in (19), wherein the head has a pair of drums, and each drum of the pair of drums has, on the outer circumferential surface thereof, a plurality of pixel electrodes that form electric fields that are applied to the electronic paper.

(21) The electronic paper printer described above in (19), wherein the head has a pair of drums, and one drum of the pair of drums has, on the outer circumferential surface thereof, a plurality of pixel electrodes that form electric fields that are applied to the electronic paper, and the other drum thereof has, on the outer circumferential surface thereof, a common electrode that forms the electric fields together with the pixel electrodes.

(22) The electronic paper printer described above in (21), configured such that two electric fields oriented in different directions between the common electrode and the pixel electrodes can be selectively formed by setting the electrical potential of the common electrode at a prescribed value.

(23) The electronic paper printer described above in any one of (20), (21), or (22), wherein the plurality of pixel electrodes is deployed in a matrix arrangement.

(24) The electronic paper printer described above in any one of inventions (20) to (23), having a plurality of switching elements that can switch between forming and extinguishing the electric fields produced by the plurality of pixel electrodes.

(25) The electronic paper printer described above in (24), wherein the switching elements are thin film transistors.

(26) The electronic paper printer described above in any one of inventions (1) to (25), wherein the electronic paper has a base layer and an electronic ink layer, and the plurality of capsules is dispersed in the electronic ink layer.

DESCRIPTION OF THE PREFERRED EMBODIMENTS

Figure 1:
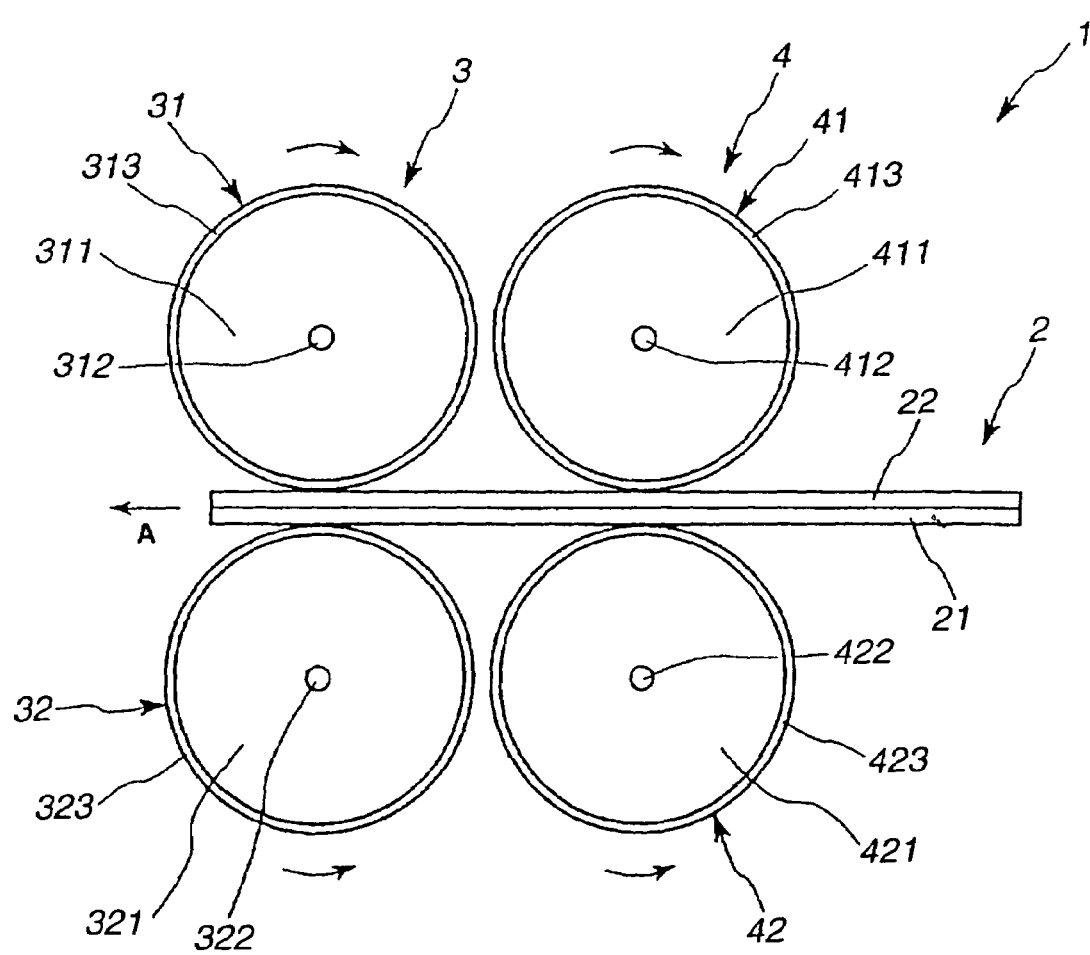
FIG. 1 is a side elevation representing a first embodiment of the electronic paper printer of the present invention.

The electronic paper printer (electronic paper printing apparatus) of the present invention is now described in detail with reference to the best embodiments diagrammed in the drawings.

FIG. 1 is a side elevation representing a first embodiment of the electronic paper printer of the present invention.

An electronic paper printer 1 indicated in FIG. 1 is an apparatus for describing (printing) prescribed display patterns displays such as text characters, numbers, and graphics pictures on electronic paper 2 that will be described subsequently.

This electronic paper printer 1 has a describing head (first head) 3 for describing display patterns on the electronic paper 2, an erasing head (second head) 4 for erasing display patterns that have been described on the electronic paper 2, a drive mechanism (not shown) for driving the describing head 3 and erasing head 4 so that they revolve, and a conveyor mechanism (not shown) for conveying the electronic paper 2. The direction of arrow A in FIG. 1 is the direction the electronic paper 2 is conveyed in.

Figure 2:
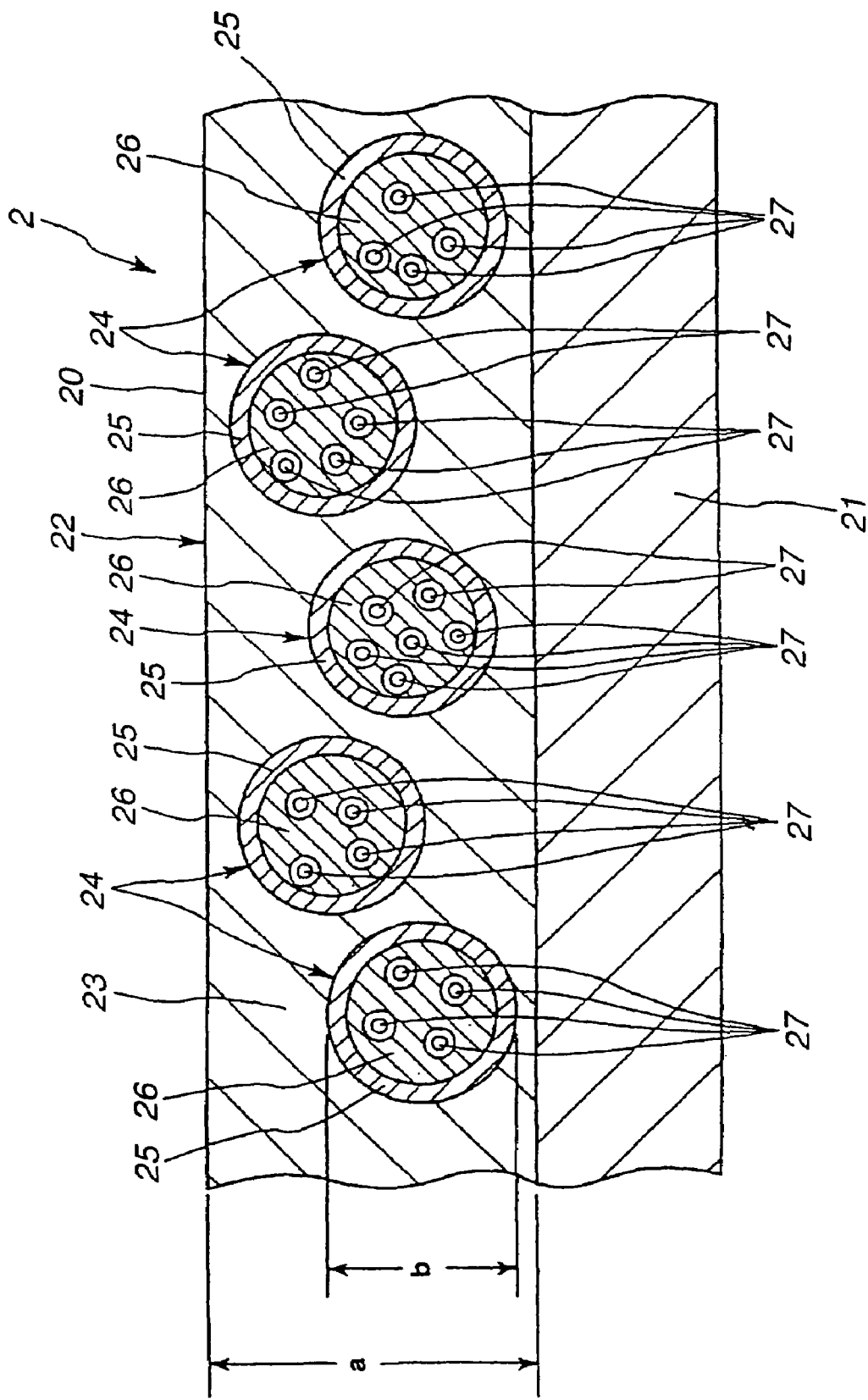
FIG. 2 is a cross-sectional view of an example configuration of electronic paper in the present invention.
Figure 3:
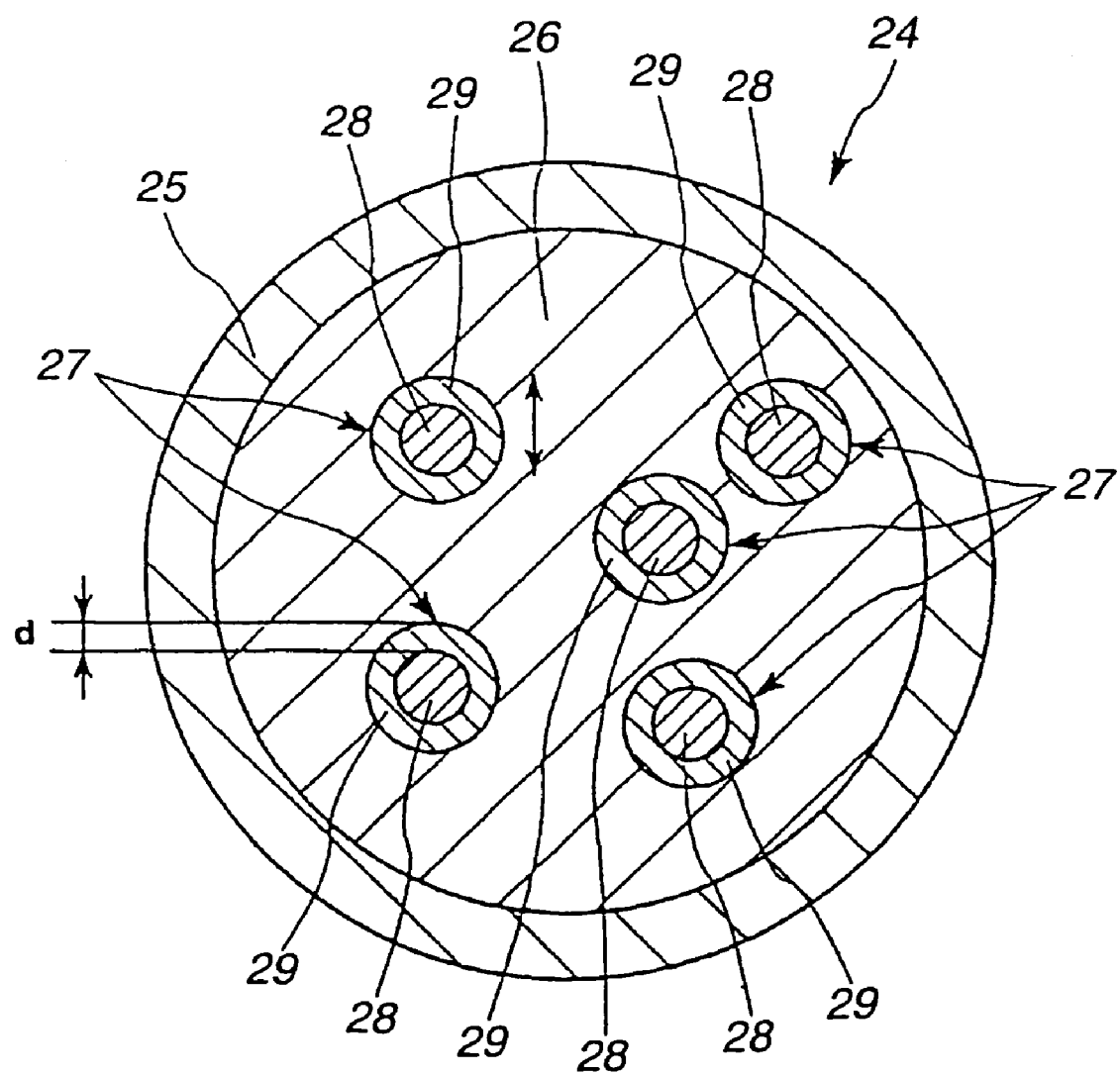
FIG. 3 is a cross-sectional view representing a micro-capsule in the electronic paper diagrammed in FIG. 2.

FIG. 2 is a cross-sectional diagram of an example configuration for the electronic paper 2. FIG. 3 is a cross-sectional diagram of a micro-capsule in the electronic paper diagrammed in FIG. 2.

The electronic paper 2 diagrammed in FIG. 2 constitutes display means (display media) capable of rewriting and erasing display patterns using electrophoresis.

This electronic paper 2 comprises paper (a sheet-form base layer exhibiting flexibility) 21 and an electronic ink layer 22 formed on the paper 21. The surface on the upper side of this electronic ink layer 22, as diagrammed in FIG. 2, is a display surface 20 whereon display patterns are displayed.

The electronic ink layer 22 comprises a transparent binder 23 exhibiting light transmissivity and a plurality of micro-capsules 24 which are fixed in a state wherein they are uniformly dispersed in the binder 23.

It is desirable that the thickness a of the electronic ink layer 22 be from 1.5 to 2 times the outer diameter (i.e. diameter) b of the micro-capsules 24.

Polyvinyl alcohol or the like can be used as the binder 23.

As diagrammed in FIG. 3, each micro-capsule 24 has a main capsule body 25 that is shaped as a hollow sphere and exhibits light transmissivity. The interior of this main capsule body 25 is filled with a liquid solvent 26. In this liquid 26 is dispersed a plurality of charged particles 27 having negative charges.

Each charged particle 27 comprises a nucleus 28 and a covering layer 29 that covers the nucleus 28.

The colors of the charged particles 27 and the liquid 26 are set so as to be mutually different. If the color of the charged particles 27 is made white, for example, the color of the liquid 26 might be made blue, red, green, or black.

When an external electric field (i.e. electric field) is applied to the micro-capsule 24, the charged particles 27 move, inside the main capsule body 25, in a direction opposite the direction of the electric field.

If, for example, a positively charged electrode is positioned above the micro-capsule 24 (display surface 20 side), as diagrammed in FIG. 3, an electric field is produced that is directed toward the bottom in FIG. 3, as a consequence whereof the charged particles 27 move (float up) to the upper side, as diagrammed in FIG. 3, inside the main capsule body 25. Due to these charged particles 27, the color of the upper side of the micro-capsule 24, as diagrammed in FIG. 3, will turn white.

Conversely, if a negatively charged electrode is positioned on the upper side of the micro-capsule 24, as diagrammed in FIG. 3, an electric field will be produced that is directed toward the upper side, in FIG. 3. As a consequence, the charged particles 27 will move down (sink) toward the lower side in the main capsule body 25, as diagrammed in FIG. 3. In this case, the liquid 26 is positioned on the upper side in the main capsule body 25, as diagrammed in FIG. 3, wherefore, if the color of the liquid is blue, the color of the upper side of the micro-capsule 24, as diagrammed in FIG. 3, will become blue.

The micro-capsules 24 are configured such that the specific gravity of the liquid 26 and the specific gravity of the charged particles 27 become equal.

Thus, the charged particles 27, after moving either up or down, as diagrammed in FIG. 3, can remain in a certain position for a long period of time, even if the electric field disappears, the color on the upper side of the micro-capsule 24, as diagrammed in FIG. 3, can be maintained white, and the color of the liquid can be maintained blue, for example, for a long time. In other words, the display on the electronic paper 2 can be maintained for a long period of time.

In order to make the specific gravity of the liquid 26 and the specific gravity of the charged particles 27 equal, furthermore, the thickness d of the covering layer 29, for example, may be adjusted.

The outer diameter b of the micro-capsule 24 should be 180 µm or less, with 10 to 20 µm or so being preferable.

$TiO_2$ (rutile structure) or the like, for example, can be used for the nuclei 28 of the charged particles 27.

A polyethylene or the like, for example, can be used for the covering layer 29 of the charged particles 27.

For the liquid 26, a solution can be used wherein an anthraquinone-based dye is dissolved in ethylene tetrachloride and isoparaffin, for example.

As diagrammed in FIG. 1, the describing head 3 is configured by a pair of drums 31 and 32 supported so that they can freely turn. The outer diameter of the drum 31 and the outer diameter of the drum 32 are set so as to be identical.

The outer diameter of the drums 31 and 32 is not particularly limited, but 3 to 30 cm or so is desirable.

By making the outer diameters of the drums 31 and 32 large, the area of contact between the drums 31 and 32 and the electronic paper 2 can be increased, thereby enhancing the display pattern describing speed.

These drums 31 and 32 have axes (turning axes 312 and 322), respectively, which are mutually parallel, and the drums 31 and 32 are positioned so that the distance between the outer circumferential surfaces thereof is a prescribed distance. These drums 31 and 32 are also positioned so that the drum 31 is on the upper side, as diagrammed in FIG. 1, that is, on the electronic ink layer 22 side of the electronic paper 2, and so that the drum 32 is on the lower side, as diagrammed in FIG. 1, that is, on the paper 21 side of the electronic paper 2.

The interval between the outer circumferential surface of the drum 31 and the outer circumferential surface of the drum 32 is set so that the electronic paper 2 can pass between the drum 31 and the drum 32, and so that the drum 31 and the drum 32 can apply pressure and electric fields on the electronic paper 2 as sufficient and as necessary.

The drum 31 has a cylindrical drum body 311. On the outer circumferential surface of this drum body 311 is deployed a circuit board 313 comprising a plurality of pixel electrodes (upper electrodes). This circuit board 313 will be described in detail subsequently.

The drum 32, meanwhile, has a cylindrical drum body 321. On the outer circumferential surface of this drum body 321 is deployed a common electrode (lower electrode) 323.

Figure 4:
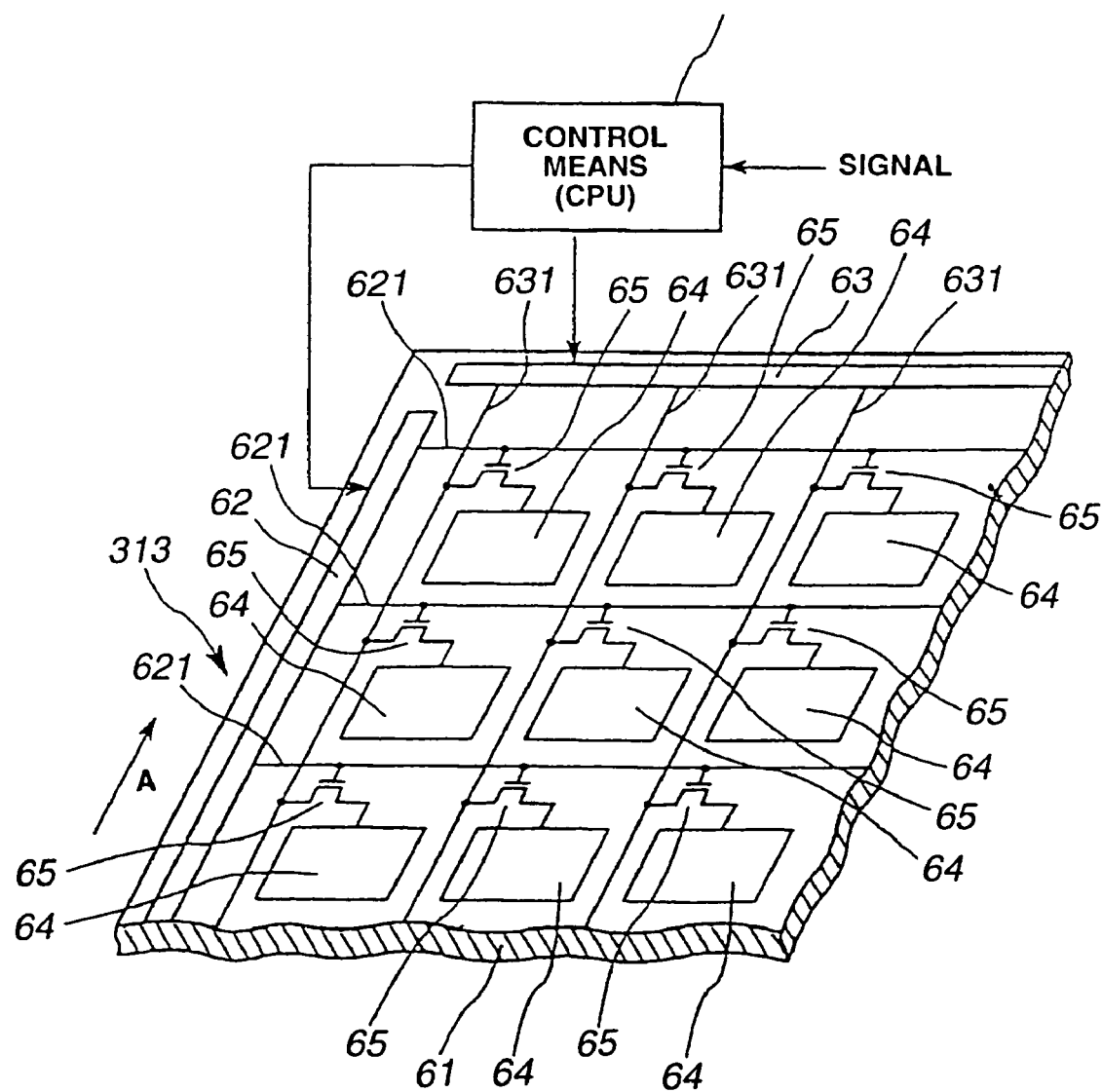
FIG. 4 is a block diagram representing in model form the condition wherein a circuit board is deployed in the present invention.

FIG. 4 is a diagram (block diagram) which represents in model form the condition wherein the circuit board 313 is deployed. The direction of arrow A in FIG. 4 is the direction in which the electronic paper 2 is conveyed.

Figure 5:
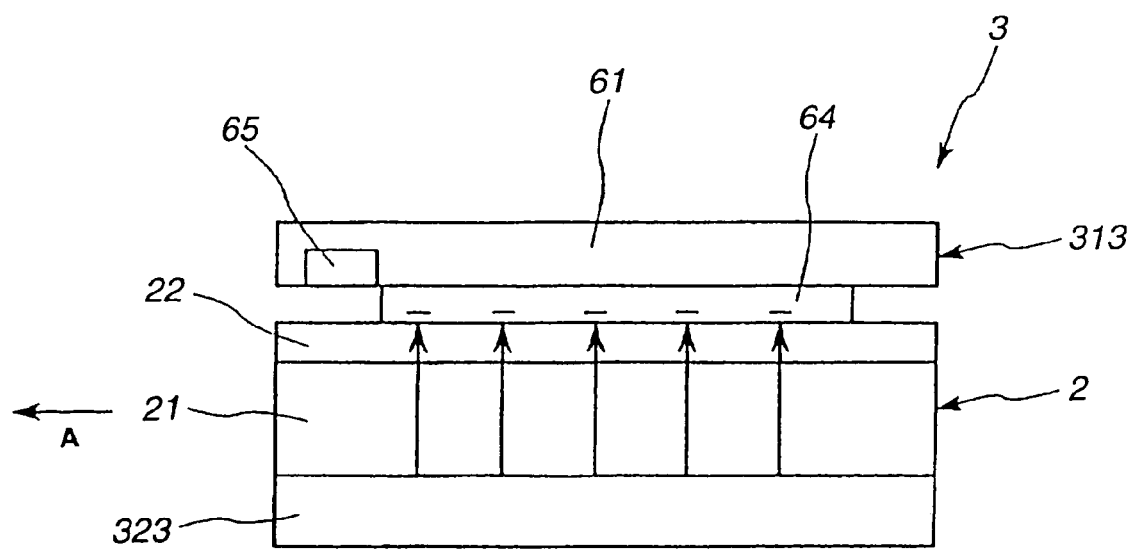
FIG. 5 is a side elevation representing one pixel in a describing head in the present invention.

FIG. 5 is a side elevation representing one pixel in the describing head 3. The direction of arrow A in FIG. 5 is the direction in which the electronic paper 2 is conveyed.

As diagrammed in FIG. 4, the circuit board 313 has a substrate 61 formed of a resin exhibiting flexibility (elasticity).

On this substrate 61 are formed, respectively, a plurality of square pixel electrodes 64 deployed (arrayed) in a matrix arrangement, a plurality of thin film transistors (TFTs) (switching elements) 65 for switching the pixel electrodes 64 between conducting and non-conducting states, respectively, a gate driver 62 for applying voltages (signals) to the gates of the thin film transistors 65, a source driver 63 for applying voltages (signals) to the sources of the thin film transistors 65, a plurality of gate lines 621 that extend laterally, as diagrammed in FIG. 4, and a plurality of source lines 631 that extend vertically, as diagrammed in FIG. 4.

Each pixel electrode 64 corresponds to one pixel (bit).

There is no particular limitation on the pitch of the pixel electrodes 64, but a pitch of 500 to 5000 dpi (dots per inch) or so is desirable.

In the present invention, needless to say, the shape of the pixel electrodes 64 is not limited to a square shape.

In the present invention, furthermore, the pattern in which the pixel electrodes 64 are arrayed is not limited to a matrix arrangement. There is no reason why the pixel electrodes 64 may not be deployed in a delta arrangement, for example.

Hereinafter, with respect to FIG. 4, the uppermost laterally oriented array is called the "first row" and the Nth laterally oriented array from the top is called the "Nth row."

With respect to FIG. 4, furthermore, the leftmost vertically oriented array is called the "first column" and the Nth vertically oriented array from the left side is called the "Nth column."

To the gate drive 62 is connected each of the plurality of gate lines 621 that extend laterally, as diagrammed in FIG. 4.

To the source driver 63, furthermore, is connected each of the plurality of source lines 631 that extend vertically, as diagrammed in FIG. 4.

Each of the thin film transistors 65, moreover, is connected to a corresponding gate line 621.

Each of the sources of the thin film transistors 65, furthermore, is connected to a corresponding source line 631, and each of the drains of the thin film transistors 65 is connected to a corresponding pixel electrode 64.

The gate driver 62 sequentially scans the gate lines 621 one row (line) at a time.

"To scan the Nth row gate line 621," for examples means to apply a voltage (scan voltage) precisely during a scanning time (time) t to the gates of all of the thin film transistors 65 in the Nth row, and [thus] turn on all of the thin film transistors 65 (i.e. the gates of the thin film transistors 65) in the Nth row for precisely the scanning time t.

Thus the role of the gate driver 62 is to sequentially scan the Nth row, and then the N+1'th row, and then the N+2'th row, that is, to sequentially turn on all of the thin film transistors 65 in each of the rows, in row units (i.e. one row at a time), for precisely the scanning time t.

The source driver 63 is also called a data line drive circuit. This is a circuit that applies a voltage corresponding to printing information (information indicating a display pattern) to the pixel electrodes 64 via the source lines 631 and the thin film transistors 65 when a scanning voltage is applied to a prescribed gate line 621, that is, when all of the thin film transistors 65 in a prescribed row are turned on.

When a scanning voltage is applied to a prescribed gate line 621, the voltage noted above is applied to the prescribed source line 631, so that the corresponding pixel electrode 64 conducts. Thus a negative voltage at a prescribed level can be applied to the corresponding pixel electrode 64, for example, and, as diagrammed in FIG. 5, that pixel electrode 64 can be given a negative charge, for example. When this is done, if the potential on the common electrode 323 has been set at 0 volts, an electric field will be formed (will appear) that is directed toward that pixel electrode 64.

The level of the voltage applied between the pixel electrode 64 noted above and the common electrode 323 (that is, the potential difference between that pixel electrode 64 and the common electrode 323) is not particularly limited, but, in terms of absolute values, a voltage of 10 volts or higher is desirable, and 20 volts or higher is even more preferable.

The drives for the thin film transistors 65 noted earlier are controlled, respectively, by control means 7 via the gate driver 62 and the source driver 63.

The control means 7 are ordinarily configured by an integrated circuit comprising a logic circuit and a memory circuit. The control means 7 control, in addition to the thin film transistors 65, the thin film transistors 65, etc., on the drum 41 of the erasing head 4 (described subsequently), and also the entire electronic paper printer 1.

It is desirable that the formation of the circuit board 313 on the outer circumferential surface of the drum body 311, as described earlier, be performed as described below, for example.

First, a circuit unit comprising a thin film transistor array and pixel electrode array, etc., as described in the foregoing, is formed on a prescribed substrate (not shown), and this is then peeled away from the substrate by a prescribed method and transferred to the substrate 61. Thus is obtained the circuit board 313. For the details of this method, the Japanese Patent Kokai No. H10-125930/1998 for which filing was made by the present applicant may be referenced.

Next, this circuit board 313 is wrapped about and fixed to the outer circumferential surface of the drum body 311.

As diagrammed in FIG. 1, the erasing head 4 is deployed on the right side (in FIG. 1) of the describing head 3 (i.e. on the upstream side thereof as respecting the direction of conveyance of the electronic paper 2), separated from the describing head 3 by a prescribed distance.

This erasing head 4, similarly to the describing head 3 described earlier, is configured by a pair of drums 41 and 42 that are supported so that they turn freely. The outer diameters of the drum 41 and the drum 42 are set equal to the outer diameters of the drum 31 and drum 32 of the describing head 3 described earlier (the outer diameter of the drum 41 and the outer diameter of the drum 42 also being set equal).

There is no particular limitation on the outer diameter of the drums 41 and 42, but, as with the drums 31 and 32 described earlier, a diameter of 3 to 30 cm or so is desirable.

By making the outer diameters of the drums 41 and 42 large, the area of contact between the drums 41 and 42 and the electronic paper 2 can be increased, thereby enhancing the display pattern erasing speed.

These drums 41 and 42 have axes (turning axes 412 and 422), respectively, which are mutually parallel, and the drums 41 and 42 are positioned so that the distance between the outer circumferential surfaces thereof is a prescribed distance, similarly to the describing head 3 described earlier. These drums 41 and 42 are also positioned, similarly to the describing head 3 described earlier, so that the drum 41 is on the upper side, as diagrammed in FIG. 1, that is, on the electronic ink layer 22 side of the electronic paper 2, and so that the drum 42 is on the lower side, as diagrammed in FIG. 1, that is, on the paper 21 side of the electronic paper 2.

The drum 41 has a cylindrical drum body 411. On the outer circumferential surface of this drum body 411 is deployed a circuit board 413 comprising a plurality of pixel electrodes (upper electrodes) 64, as in the describing head 3 described earlier. This circuit board 413 is like the circuit board 313 in the describing head 3 described earlier, wherefore the description thereof will be abridged.

The drum 42, meanwhile, has a cylindrical drum body 421. On the outer circumferential surface of this drum body 421 is deployed a common electrode (lower electrode) 423.

Figure 6:
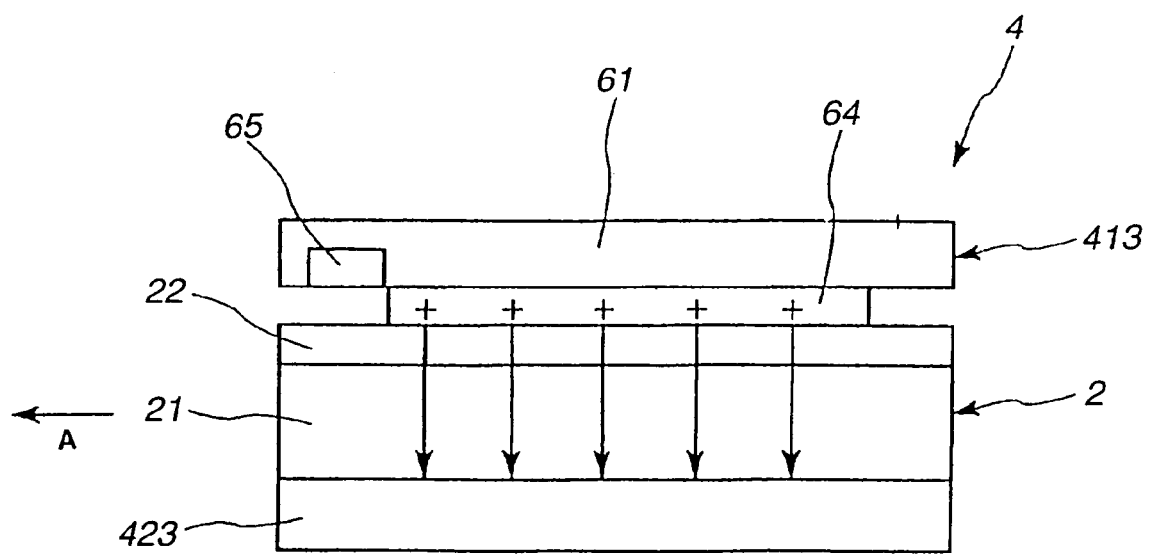
FIG. 6 is a side elevation representing one pixel in an erasing head in the present invention.

FIG. 6 is a side elevation of one pixel in the erasing head 4. The direction of arrow A in FIG. 6 is the direction in which the electronic paper 2 is conveyed.

The gate driver 62 sequentially scans the gate lines 621 one row (line) at a time (cf. FIG. 4).

"To scan the Nth row gate line 621," for example, means to apply a voltage (scan voltage) precisely during a scanning time (time) t to the gates of all of the thin film transistors 65 in the Nth row, and [thus] turn on all of the thin film transistors 65 (i.e. the gates of the thin film transistors 65) in the Nth row for precisely the scanning time t.

Thus the role of the gate driver 62 is to sequentially scan the Nth row, and then the N+1'th row, and then the N+2'th row, that is, to sequentially turn on all of the thin film transistors 65 in each of the rows, in row units (i.e. one row at a time), for precisely the scanning time t.

The source driver 63 is also called a data line drive circuit. This is a circuit that applies a voltage to the pixel electrodes 64 via the source lines 631 and the thin film transistors 65 when a scanning voltage is applied to a prescribed gate line 621, that is, when all of the thin film transistors in a prescribed row are turned on.

When a scanning voltage is applied to a prescribed gate line 621, the voltage noted above is applied to the prescribed source line 631, so that the corresponding pixel electrode 64 conducts. Thus a positive voltage at a prescribed level can be applied to the corresponding pixel electrode 64, and, as diagrammed in FIG. 6, that pixel electrode 64 can be given a positive charge. When this is done, an electric field will be formed that is directed away from that pixel electrode 64 toward the common electrode 423.

The level of the voltage applied between the pixel electrode 64 noted above and the common electrode 423 (that is, the potential difference between that pixel electrode 64 and the common electrode 423) is not particularly limited, but, in terms of absolute values, a voltage of 10 volts or higher is desirable, and 20 volts or higher is even more preferable.

The formation of the circuit board 413 on the outer circumferential surface of the drum body 411 described in the foregoing should be performed using the same method as for forming the circuit board 313 to the outer circumferential surface of the drum body 311 as described earlier.

The action of the electronic paper printer 1 is described next.

When describing display patterns on the electronic paper 2 with the electronic paper printer 1, as diagrammed in FIG. 1, the drum 31 of the describing head 3 turns clockwise, as shown in FIG. 1, a prescribed number of revolutions (turning speed), while the drum 32 turns counterclockwise, as shown in FIG. 1, the same number of revolutions as the drum 31. This turning is performed by a drive mechanism.

Similarly, the drum 41 of the erasing head 4 turns clockwise, as shown in FIG. 1, the same number of revolutions as the drum 31, while the drum 42 turns counterclockwise, as shown in FIG. 1, the same number of revolutions as the drum 41. This turning is likewise performed by a drive mechanism.

Furthermore, since the outer diameters of the drums 31, 32, 41, and 42 are all the same, as described earlier, the liner speed at the outer circumferential surface of the drums 31, 32, 41, and 42 are all the same.

The electronic paper 2 is conveyed by the conveyor mechanism from the left side, as shown in FIG. 1, to the erasing head 4.

The control means 7 drive the gate driver 62, scan all of the thin film transistors 65 in the erasing head 4, and turn them on, one row at a time.

When this is done, the control means 7 also drives the source driver 63, and outputs the same electrical potential to all of the source lines 631.

The control means 7, moreover, begin the scanning and the signal output described above before the electronic paper 2 contacts the pixel electrodes 64 in each column.

Thus, as diagrammed in FIG. 6, a positive voltage, for example, at a prescribed level, is applied to all of the pixel electrodes 64. And, if the potential on the common electrode 423 has been set at 0 volts, electric fields are formed from the corresponding pixel electrodes 64 toward the common electrode 423.

The electronic paper 2 is held between the drum 41 and the drum 42 and carried along in the direction of arrow A. That is, the electronic paper 2, from the leading end (the part on the left in FIG. 1), passes successively between the drums 41 and the drum 42. When this happens, the electronic paper 2 is subjected to prescribed pressures and placed in the electric fields described earlier (i.e. subjected to those electric fields), sequentially from the leading end, by the drum 41 and the drum 42.

As one example, a description is now given of a mode wherewith, after the entire surface of the electronic paper 2 is made white by the erasing head 4, blue text characters and graphics are drawn by the describing head 3.

As diagrammed in FIG. 7, the charged particles 27 in the electronic paper 2 placed in the electric field as noted above move to the upper side, as shown in FIG. 7, in the main capsule units 25, respectively, due to that electric field. These charged particles 27 cause the display surface 20 of the electronic paper 2 corresponding thereto to turn white.

Thereafter, in the same manner, the electronic paper 2 passes between the drum 41 and the drum 42, whereupon the color of the display surface 20 thereof becomes white.

Then, when the electronic paper 2 passes between the drum 41 and the drum 42 all the way to the basal end thereof (the part on the right side in FIG. 1), the color of the display surface 20 of the electronic paper 2 will be completely white. That is, all of the display patterns described on the electronic paper 2 will be erased (i.e. the electronic paper 2 will be reset).

Furthermore, as diagrammed in FIG. 1, the electronic paper 2 is carried along by the drum 41 and the drum 42 in the direction of arrow A and thereby conveyed to the describing head 3.

The control means 7, while controlling the gate voltage on the thin film transistors 65, also control the source voltages on the thin film transistors 65 based on signals indicating display patterns (such as image signals, for example).

More specifically, the control means 7 drive the gate driver 62 and scan the gate lines 621 on a time-division basis. As diagrammed in FIG. 4, first of all, a pulse voltage is applied to the first row gate line 621 for the time t, thus turning on (opening) the gates of all of the thin film transistors 65 in the first row. That is, all of the thin film transistors 65 in the first row are turned on for precisely the time t. Next, a pulse voltage is applied to the second row gate line 621, thus turning on all of the thin film transistors 65 in the second row for precisely the time t. Thereafter, pulse voltages are applied sequentially to the [remaining] gate lines 621 in the same manner.

Then the control means 7 send signals (image signals, for example) corresponding to the target row or rows to the source driver 63, drive the source driver 63, and, during the time t that the thin film transistors 65 in the target row or rows are turned on, applies a voltage for each row in the targeted rows to the sources of the thin film transistors 65 corresponding to the target row or rows. Thus voltages corresponding to the signals noted above are applied across the sources and drains in the thin film transistors 65 of the target row or rows. If the target row is the second row, for example, when −20 volts are applied to the sources of the thin film transistors 65 in the second column, it is only necessary that the voltage on the second column of the source driver, that is, on the second column source line 631, be −20 volts.

Thus, as diagrammed in FIG. 5, a negative voltage at a prescribed level is applied to the target pixel electrodes 64, and the target pixel electrodes 64 are charged negatively. If the potential on the common electrode 323 has been set at 0 volts, moreover, electric fields will be formed that respectively are oriented toward the target pixel electrodes 64 opposing that common electrode 323.

As diagrammed in FIG. 1, the electronic paper 2 is held between the drum 31 and the drum 32 and carried along in the direction of arrow A. That is, the electronic paper 2, from the leading end, passes successively between the drums 31 and the drum 32. When this happens, the electronic paper 2 is subjected to prescribed pressures and placed in the electric fields described earlier, sequentially from the leading end, by the drum 31 and the drum 32.

Figure 8:
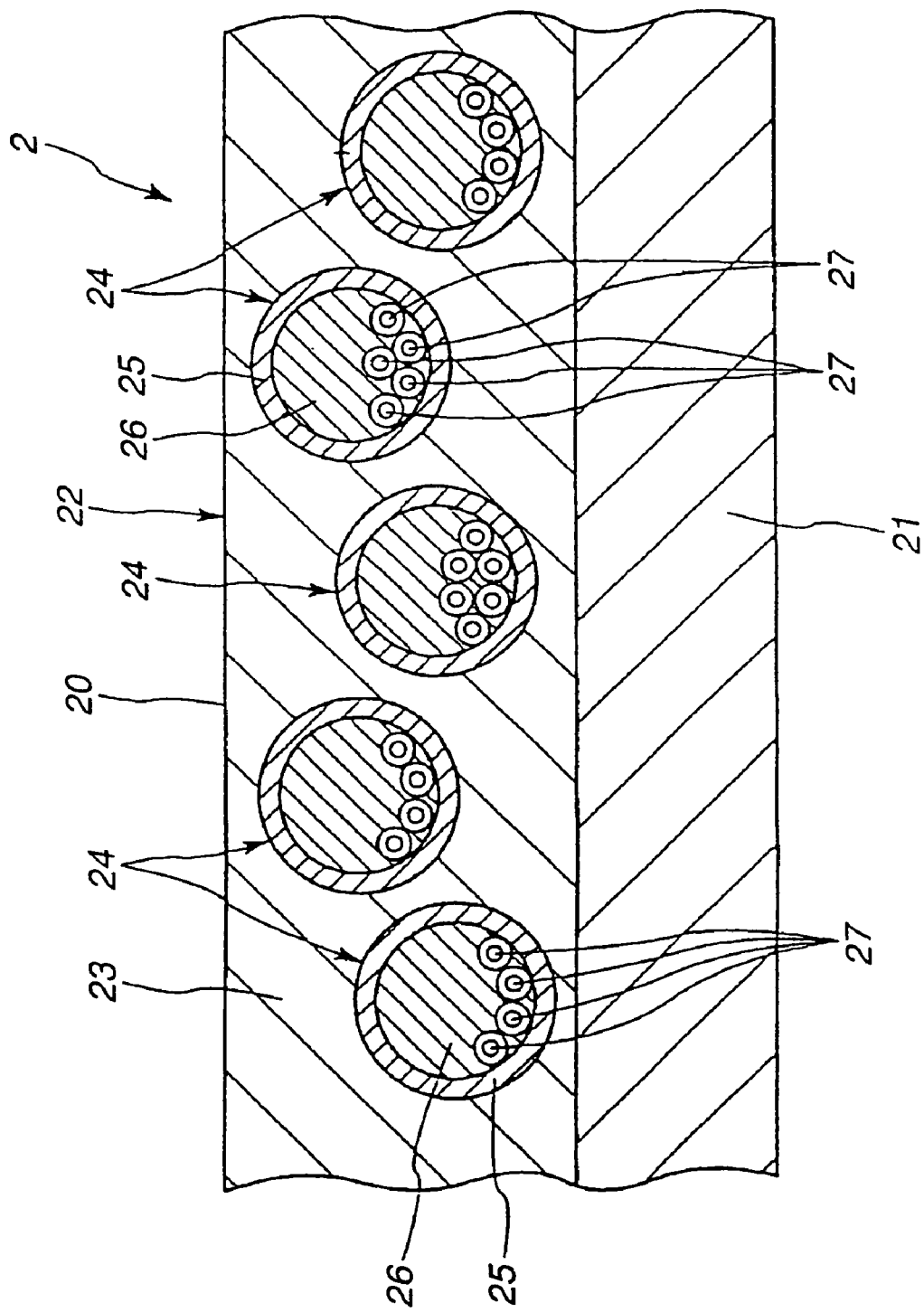
FIG. 8 is a cross-sectional view representing an example configuration of the electronic paper in the present invention.

As diagrammed in FIG. 8, the charged particles 27 in the electronic paper 2 placed in the electric field as noted above move to the lower side, as shown in FIG. 8, in the main capsule units 25, respectively, due to that electric field. In this case, the liquid 26 is positioned on the upper side, as shown in FIG. 8, inside the main capsule units 25, wherefore the color of the display surface 20 of the electronic paper 2 corresponding thereto turns blue. That is, a portion of the display pattern is described on the electronic paper 2.

Thereafter, in the same manner, when the electronic paper 2 passes between the drum 31 and the drum 32, a portion of the display pattern is described.

Then, when the electronic paper 2 has passed through the drum 31 and the drum 32 up to the basal end thereof, all of the display pattern will have been described on the electronic paper 2. Thereupon, the describing of the display pattern on the electronic paper 2 is completed.

When the display pattern on this electronic paper 2 is rewritten, or when a display pattern is described on another electronic paper 2, as described in the foregoing, first the display pattern is erased by the erasing head 4, and then the new display pattern is described.

When erasing a display pattern from the electronic paper 2, only erasure of the display pattern by the erasing head 4 described in the foregoing is performed.

As described in the foregoing, if this electronic paper printer 1 is employed, it is possible to repeatedly describe such prescribed display patterns as text characters, numbers, and graphics, etc., on the electronic paper 2.

Because the display patterns are described on the electronic paper 2, moreover, the display patterns are easy to view, as compared to when display patterns are displayed on a display [screen], but no waste of paper (natural resources) is involved as when printing the display patterns on paper for viewing.

Also, with this electronic paper printer 1, because the describing is done by the drum-shaped describing head 3 (that is, because both the pixel electrodes 64 and the common electrode 423, respectively, in the describing head 3 are formed with curved surfaces), when describing is being performed, pressure can be applied uniformly to the electronic paper 2, wherefore the display patterns can be described properly and definitely on the electronic paper 2.

Similarly, because erasing is done by the drum-shaped erasing head 4 (that is, because both the pixel electrodes 64 and the common electrode 423, respectively, in the erasing head 4 are formed with curved surfaces), when erasing is being performed, pressure can be applied uniformly to the electronic paper 2, wherefore it is possible to erase display patterns described on the electronic paper 2 definitely and uniformly.

With this electronic paper 1, furthermore, the shapes of the drums in the erasing head 4 and describing head 3 are made cylindrical, wherefore it is possible to perform erasing and description of display patterns continuously without being limited by the length of the electronic paper 2 in the lateral direction as shown in FIG. 1.

With the present invention, the erasing head 4 in the electronic paper printer 1 may also be configured so that it can form a comprehensive erasing electric field. This will be shown in conjunction with a second embodiment.

Figure 9:
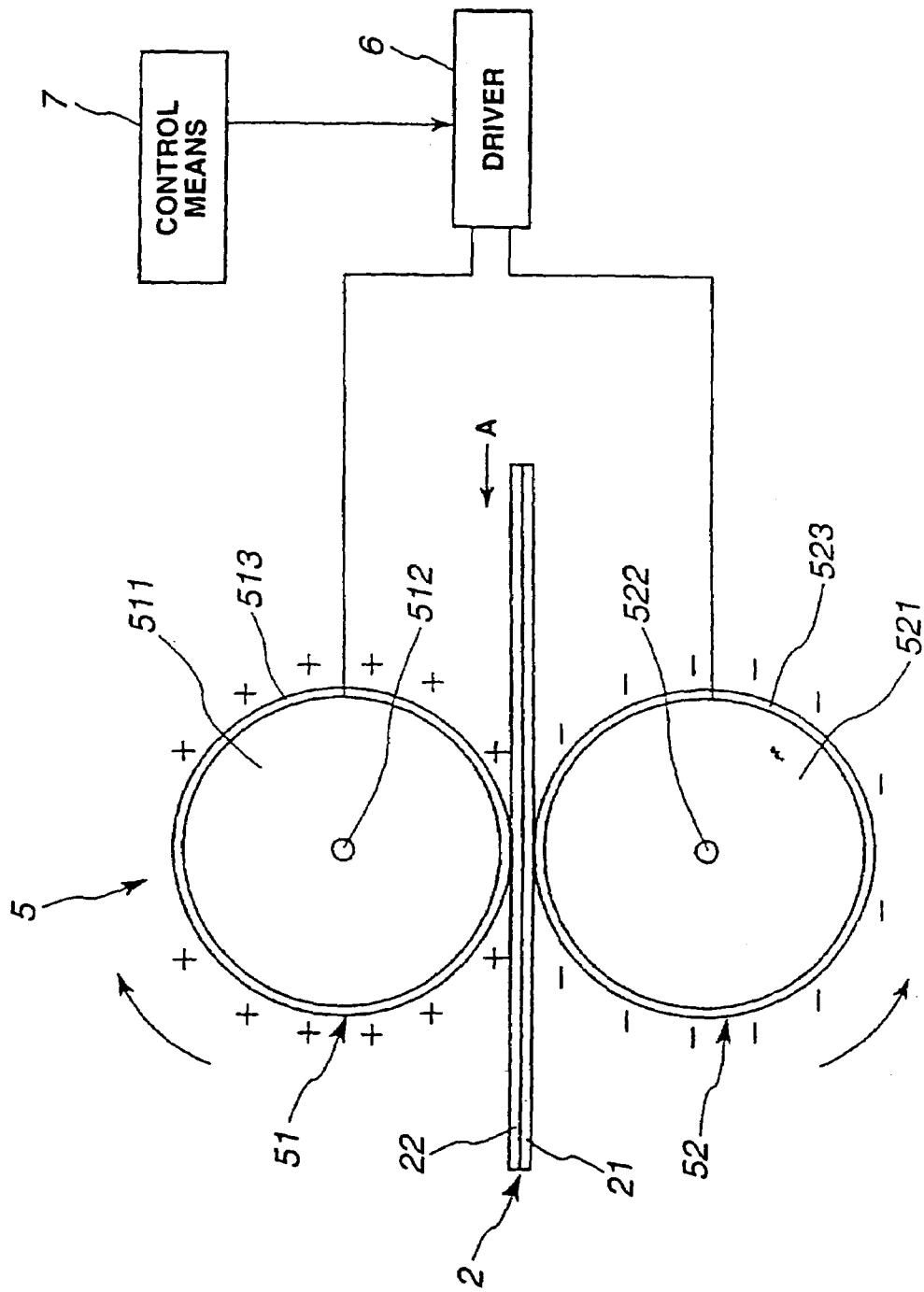
FIG. 9 is a side elevation representing an erasing head in a second embodiment of the electronic paper printer of the present invention.

FIG. 9 is a side elevation of an erasing head in a second embodiment of the electronic paper printer of the present invention.

The configuration of the electronic paper printer 1 in this second embodiment is the same as that of the electronic paper printer 1 in the first embodiment, excepting in that the structure of an erasing head 5 differs from that of the erasing head 4 in the electronic paper printer 1 in the first embodiment, described earlier. In other words, in the electronic paper printer 1 in this second embodiment, the erasing head 4 diagrammed in FIG. 1 is replaced by the erasing head 5 diagrammed in FIG. 9.

Accordingly, the erasing head 5 diagrammed in FIG. 9 is deployed on the right side of the describing head 3, as diagrammed in FIG. 1, separated from the describing head 3 by a prescribed distance.

This erasing head 5, as the describing head 3 and erasing head 4 described earlier, is configured by a pair of drums, namely the drums 51 and 52, which are supported so that they freely turn. The outer diameters of the drum 51 and the drum 52 are set so as to be equal to the outer diameters of the drum 31 and the drum 32 of the describing head 3, described earlier (the external diameter of the drum 51 being set equal to the external diameter of the drum 52).

There is no particular limitation on the external diameters of the drums 51 and 52, but, as with the diameters of the drums 31, 32, 41, and 42, described earlier, a diameter of 3 to 30 cm is desirable.

By making the outer diameters of the drums 51 and 52 large, the area of contact between the drums 51 and 52 and the electronic paper 2 can be increased, thereby enhancing the display pattern erasing speed.

These drums 51 and 52 have axes (turning axes 512 and 522), respectively, which are mutually parallel, and the drums 51 and 52 are positioned so that the distance between the outer circumferential surfaces thereof is a prescribed distance, similarly to the describing head 3 and the erasing head 4 described earlier. These drums 51 and 52 are also positioned, similarly to the erasing head 4 described earlier, so that the drum 51 is on the upper side, as diagrammed in FIG. 9, that is, on the electronic ink layer 22 side of the electronic paper 2, and so that the drum 52 is on the lower side, as diagrammed in FIG. 9, that is, on the paper 21 side of the electronic paper 2.

The drum 51 has a cylindrical drum body 511. On the outer circumferential surface of this drum body 511 is deployed a single upper electrode 513.

The drum 52, meanwhile, has a cylindrical drum body 521. On the outer circumferential surface of this drum body 521 is deployed a single lower electrode 523.

The upper electrode 513 and the lower electrode 523 are formed, for example, of a metal thin film or an electrically conducting ceramic thin film or the like.

The driver 6 is driven by commands from the control means 7, and voltages are applied across this upper electrode 513 and lower electrode 523. If, for example, a positive voltage (plus potential) is applied to the upper electrode 513 and a negative voltage (minus potential) is applied to the lower electrode 523, an electric field will be formed, directed away from the upper electrode 513 and toward the lower electrode 523, where the upper electrode 513 and the lower electrode 523 are in opposition.

There is no particular limitation on the level of the voltage applied across these electrodes, but, in terms of absolute values, 10 volts or higher is desirable, and 20 volts or higher is even more preferable.

The action of the erasing head 5 in the electronic paper printer 1 of the second embodiment is described next.

The action of the electronic paper printer 1 is the same as that of the electronic paper printer 1 in the first embodiment, described earlier, with the exception of the action of the erasing head 5. Hence only the action of the erasing head 5 is described below.

The drum 51 of the erasing head 5 is turned clockwise, as shown in FIG. 9, by the drive mechanism, the same number of revolutions as the drum 31, while the drum 52 is thereby turned counterclockwise, as shown in FIG. 9, the same number of revolutions as the drum 51.

In the second embodiment, furthermore, the outer diameters of the drums 31, 32, 51, and 52 are all the same, wherefore the linear speeds at the outer circumferential surfaces of the drums 31, 32, 51, and 52 are all the same.

The electronic paper 2 is conveyed by the conveyor mechanism from the right side, as shown in FIG. 9, to the erasing head 5, as indicated by arrow A.

The control means 7, before the electronic paper 2 is wound in between the drums 51 and 52, drive the driver 6, and apply a voltage across the upper electrode 513 and the lower electrode 523. If, for example, as diagrammed in FIG. 9, a positive voltage is applied to the upper electrode 513 and a negative voltage is applied to the lower electrode 523, an electric field will be formed that is directed from the upper electrode 513 toward the lower electrode 523 at the place where the electronic paper 2 is held between the drums 51 and 52, that is, where the upper electrode 513 and the lower electrode 523 are in opposition.

The electronic paper 2 passes successively between the drum 51 and the drum 52 from the leading end (the part on the left in FIG. 9). When this happens, as described in conjunction with the first embodiment, the prescribed pressures and electric fields are applied sequentially, from the leading end.

In this manner, when the electronic paper 2 has been placed in the electric field described in the foregoing from the leading end to the basal end, the display surface 20 of the electronic paper 2 becomes completely white. That is, even if display patterns have been described on the electronic paper 2, they are entirely erased by this erasing head 5 (the electronic paper is reset).

As described in the foregoing, when this erasing head 5 is employed, the structure can be fabricated simply and easily, control is simple, and the upper electrode 513 and the lower electrode 523, respectively, are formed singly on the drums 51 and 52, wherefore advantages are realized in that there are no connecting seams in the electrodes (i.e. electric fields can be formed continuously), and in that the incomplete erasures can be prevented from occurring in the electronic paper 2.

With the present invention, moreover, the erasing heads 4 and 5 may be formed as electrically charging bars or rollers.

A third embodiment of the electronic paper printer of the present invention is described next.

Figure 10:
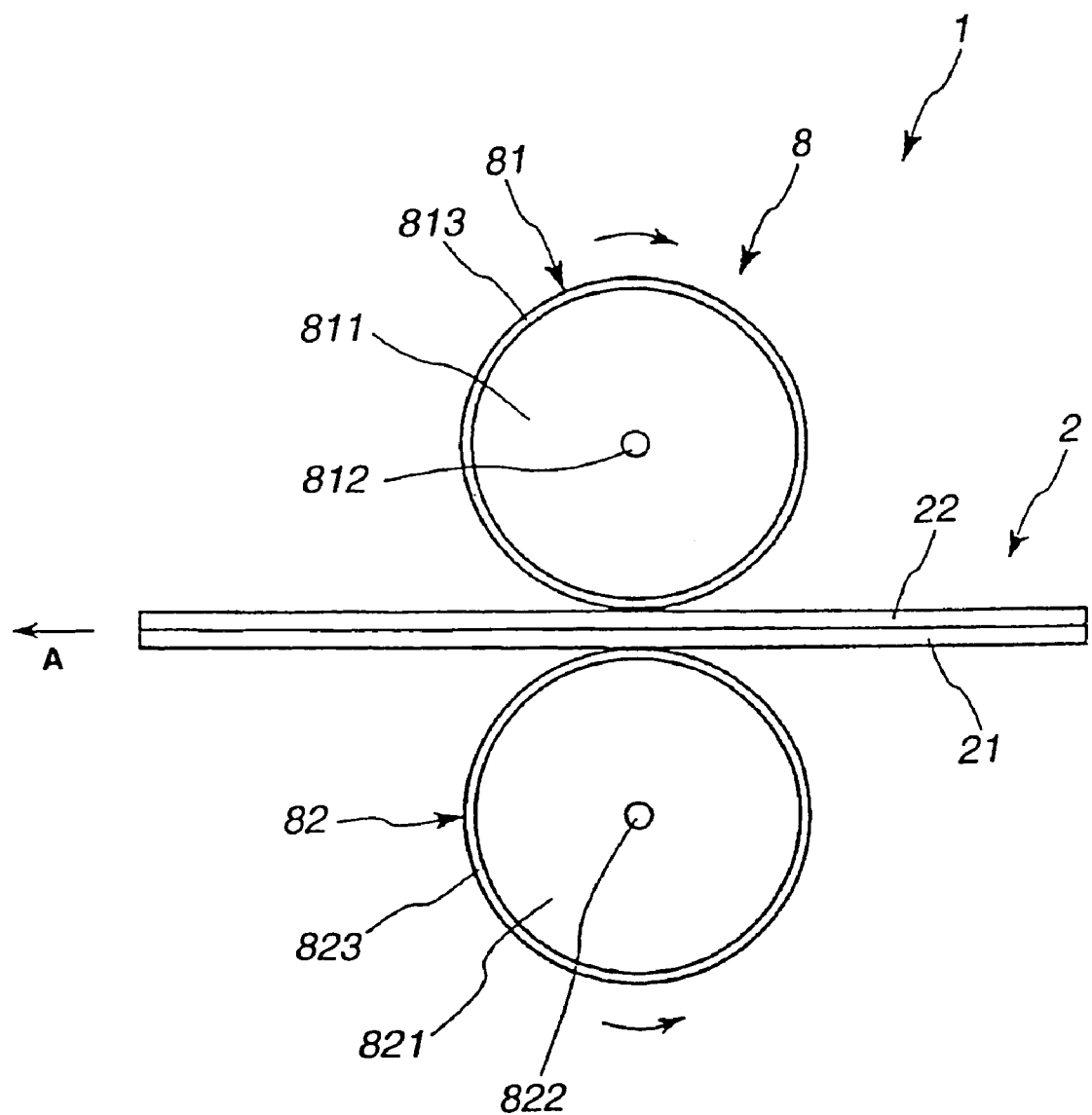
FIG. 10 is a side elevation representing a third embodiment of the electronic paper printer of the present invention.

FIG. 10 is a side elevation representing the third embodiment of the electronic paper printer of the present invention. Points in common with the electronic paper printer 1 of the first embodiment, described earlier, are not further described here. The main points of difference are described.

As diagrammed in FIG. 10, the electronic paper printer 1 has a describing head 8 for erasing display patterns described on the electronic paper 2 and describing display patterns thereon (capable also of overwriting), a drive mechanism (not shown) for driving the describing head 8 so that it turns, and a conveyor mechanism (not shown) for conveying the electronic paper 2. The direction of arrow A in FIG. 10 is the direction in which the electronic paper 2 is conveyed.

The describing head 8 is configured by a pair of drums, 81 and 82, supported so that they freely turn. The outer diameter of the drum 81 and the outer diameter of the drum 82 are set equal.

There is no particular limitation on the outer diameters of the drums 81 and 82, but a diameter of 3 to 30 cm or so is desirable.

These drums 81 and 82 have axes (turning axes 812 and 822), respectively, which are mutually parallel, and the drums 81 and 82 are positioned so that the distance between the outer circumferential surfaces thereof is a prescribed distance. These drums 81 and 82 are also positioned so that the drum 81 is on the upper side, as diagrammed in FIG. 10, that is, on the electronic ink layer 22 side of the electronic paper 2, and so that the drum 82 is on the lower side, as diagrammed in FIG. 10, that is, on the paper 21 side of the electronic paper 2.

The drum 81 has a cylindrical drum body 811. On the outer circumferential surface of this drum body 811 is deployed a circuit board 813 comprising a plurality of pixel electrodes (upper electrodes).

The drum 82, meanwhile, has a cylindrical drum body 821. On the outer circumferential surface of this drum body 821 is deployed a circuit board 823 comprising a plurality of pixel electrodes (lower electrodes).

The circuit boards 813 and 823, respectively, are the same as the circuit board 313 in the describing head 3 of the electronic paper printer 1 in the first embodiment described earlier, moreover, and so are not further described here.

Figure 11:
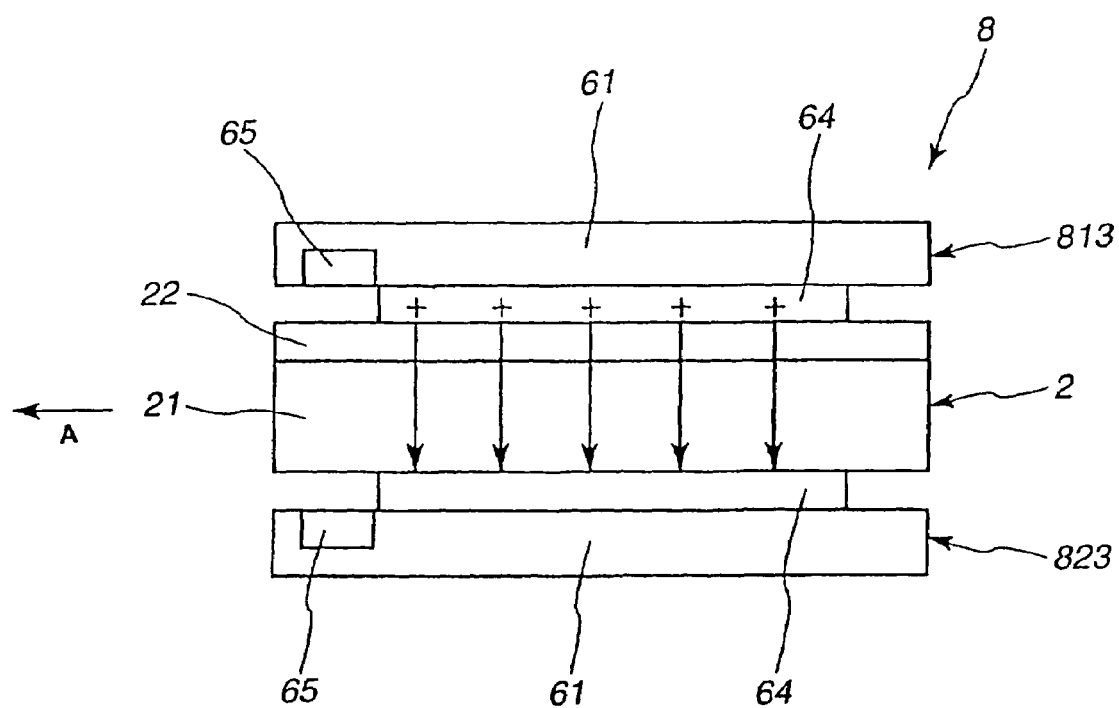
FIG. 11 is a side elevation representing one pixel in a describing head in the present invention.
Figure 12:
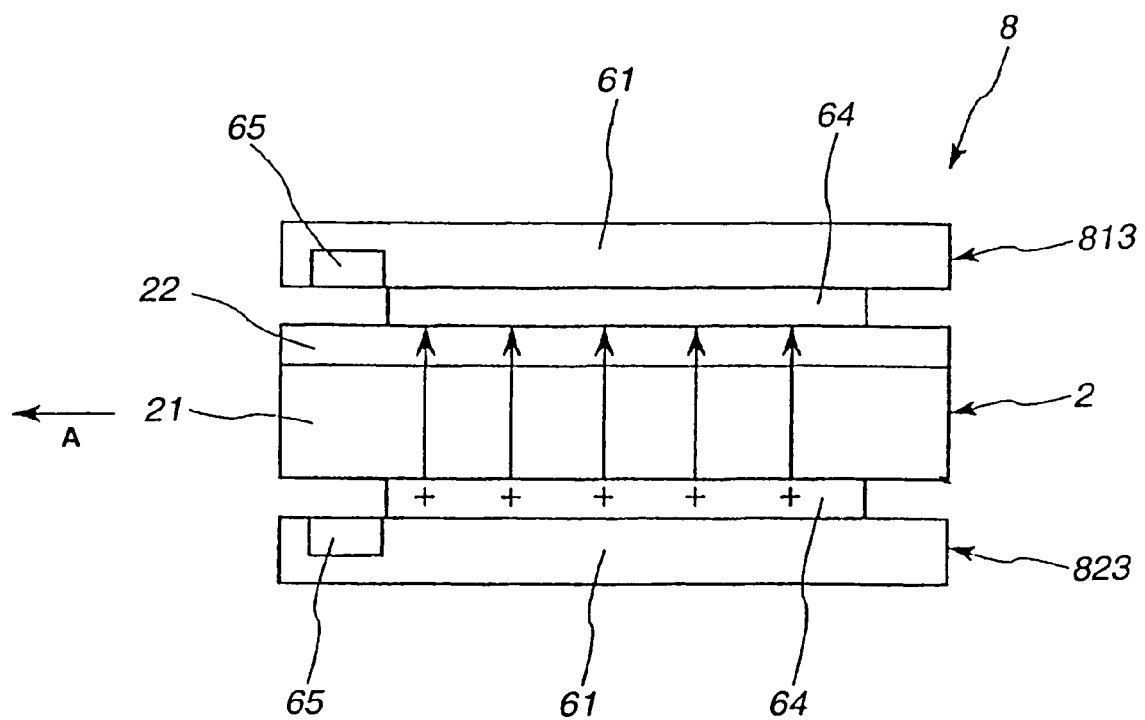
FIG. 12 is a side elevation representing one pixel in an erasing head in the present invention.

FIG. 11 and FIG. 12, respectively, are side elevations representing one pixel in the describing head 8. The direction of arrow A in FIG. 11 and FIG. 12 is the direction in which the electronic paper 2 is conveyed.

With this electronic paper printer 1, as diagrammed in FIGS. 11 and 12, the configuration is made so that positioning is done by a timing belt or encoder or the like, for example, so that the positions of the pixel electrodes 64 in the drum 81 coincide with the positions of the pixel electrodes 64 in the drum 82 corresponding thereto.

When, in the thin film transistors 65, the respective gates are turned on (i.e. a voltage is applied thereto), and a voltage at a prescribed level is applied to the sources thereof, the corresponding pixel electrodes 64 thereby conduct.

As diagrammed in FIG. 11, when the gates of thin film transistors 65 in the drum 81 are turned on and a voltage is applied to the sources thereof, a positive voltage at a prescribed level is applied to the corresponding pixel electrodes 64, and those pixel electrodes 64 are positively charged. When that happens, the gates of the thin film transistors 65 in the drum 82 are turned on, with the same timing wherewith the gates of the thin film transistors in the drum 81 are turned on, either a zero (0 volt) voltage or negative voltage is applied to the sources thereof, and those pixel electrodes 64 are either zero-charged (charge quantity=0) or negatively charged. Thus electric fields are formed that are directed from the pixel electrodes 64 in the drum 81 to the pixel electrodes 64 in the drum 82.

Conversely, as diagrammed in FIG. 12, when the gates of thin film transistors 65 in the drum 82 are turned on and a voltage is applied to the sources thereof, a positive voltage at a prescribed level is applied to the corresponding pixel electrodes 64, and those pixel electrodes 64 are positively charged. When that happens, the gates of the thin film transistors 65 in the drum 81 are turned on, with the same timing wherewith the gates of the thin film transistors in the drum 82 are turned on, either a zero voltage or negative voltage is applied to the sources thereof, and those pixel electrodes 64 are either zero-charged or negatively charged. Thus electric fields are formed that are directed from the pixel electrodes 64 in the drum 82 to the pixel electrodes 64 in the drum 81.

There is no particular limitation on the level of the voltage applied across the pixel electrodes 64 in the drum 81 and the pixel electrodes 64 in the drum 82, but 10 volts or greater is desirable, and 20 volts or greater is even more preferable.

The formation of the circuit board 813 on the outer circumferential surface of the drum body 811 noted above and the formation of the circuit board 823 on the outer circumferential surface of the drum body 821 noted above, respectively, should be performed with the same method used for forming the circuit board 313 on the outer circumferential surface of the drum body 311 in the electronic paper printer 1 in the first embodiment described earlier.

Next, the action of the electronic paper printer 1 in the third embodiment is briefly described.

With this electronic paper printer 1, when a display pattern is described on the electronic paper 2, the control means 7, based on signals indicating the display pattern (such as image signals, for example), turn on prescribed thin film transistors 65 in the drums 81 and 82, via the gate driver 62 and the source driver 63 for the drums 81 and 82, apply a voltage to the sources thereof, and thereby overwrite the display pattern.

That is, when the color of prescribed portions (pixels) on the display surface 20 of the electronic paper 2 is to be made blue, the gates in the thin film transistors 65 in the drum 81 and the thin film transistors 65 in the drum 82 corresponding to the pixels to be made blue are turned on, a positive voltage is applied to the sources of the thin film transistors 65 in the drum 82, and a zero or negative voltage is applied to the sources of the thin film transistors 65 in the drum 81.

Thus, as diagrammed in FIG. 12, a positive voltage of a prescribed level is applied to the target pixel electrodes 64 in the drum 82, and those pixel electrodes 64 are positively charged. Also, a zero voltage or a negative voltage at a prescribed level is applied to the targeted pixel electrodes 64 in the drum 81, and those pixel electrodes 64 are given a zero or negative charge. Thereupon, electric fields are formed that, respectively, are directed from the target pixel electrodes 64 in the drum 82 to the corresponding pixel electrodes 64 in the drum 81.

Conversely, when the color of prescribed portions (pixels) on the display surface 20 of the electronic paper 2 is to be made white, the gates in the thin film transistors 65 in the drum 81 and the thin film transistors 65 in the drum 82 corresponding to the pixels to be made white are turned on, a positive voltage is applied to the sources of the thin film transistors 65 in the drum 81, and a zero or negative voltage is applied to the sources of the thin film transistors 65 in the drum 82.

Thus, as diagrammed in FIG. 11, appositive voltage at a prescribed level is applied to the target pixel electrodes 64 in the drum 81, and those pixel electrodes 64 are positively charged. Also, a zero voltage or a negative voltage at a prescribed level is applied to the targeted pixel electrodes 64 in the drum 82, and those pixel electrodes 64 are given a zero or negative charge. Thereupon, electric fields are formed that, respectively, are directed from the target pixel electrodes 64 in the drum 81 to the corresponding pixel electrodes 64 in the drum 82.

As diagrammed in FIG. 8, the charged particles 27 in the electronic paper 2 placed in the electric fields directed from the pixel electrodes 64 in the drum 82 toward the pixel electrodes 64 in the drum 81 move, respectively, to the lower side, a's shown in FIG. 8, in the main capsule bodies 25 due to those electric fields. In that case, the liquid 26 is positioned on the upper side, as shown in FIG. 8, inside the main capsule bodies 25, wherefore the color of the display surface 20 of the electronic paper 2 corresponding thereto turns blue.

Figure 7:
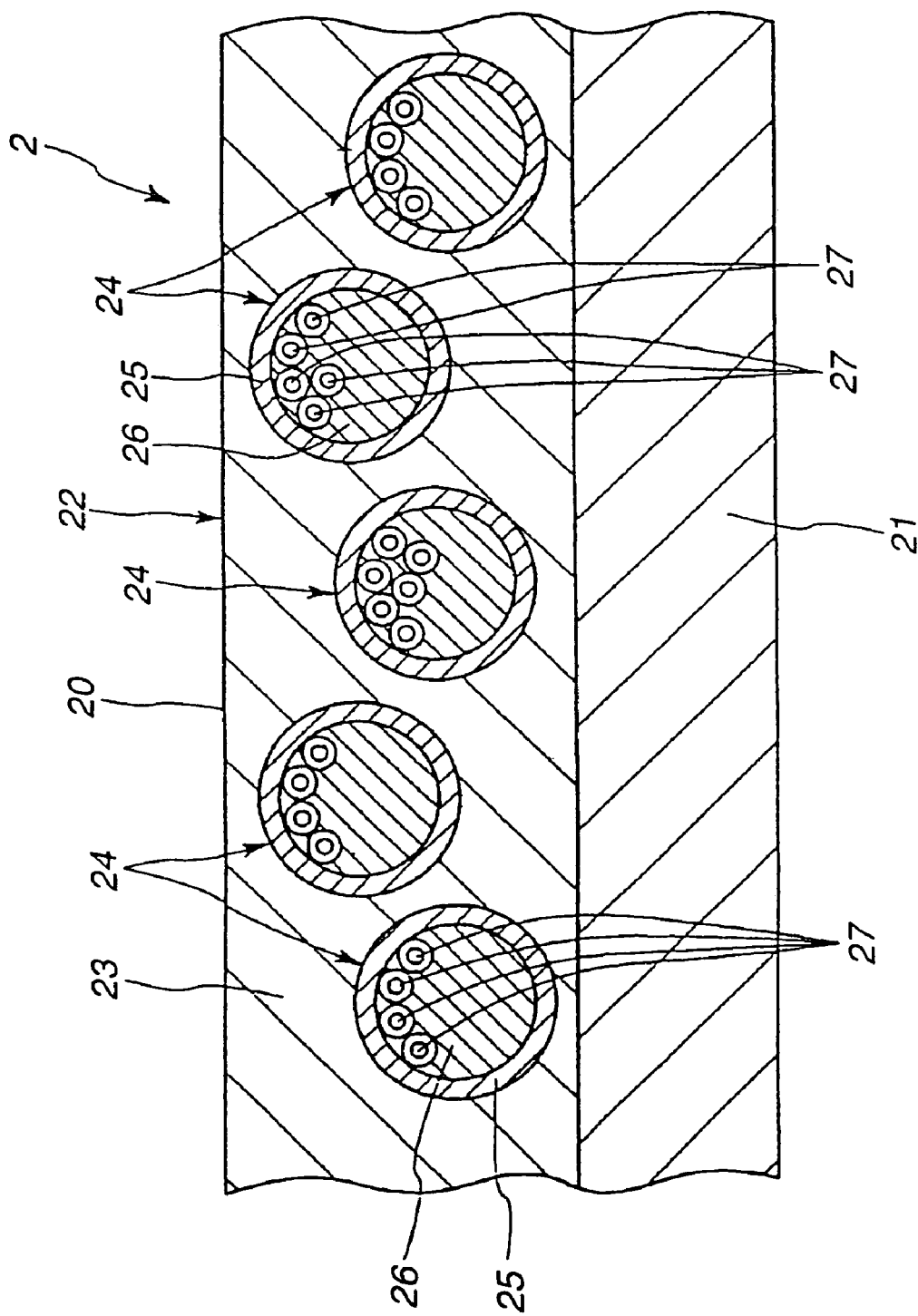
FIG. 7 is a cross-sectional view representing an example configuration of the electronic paper in the present invention.

Conversely, as diagrammed in FIG. 7, the charged particles 27 in the electronic paper 2 placed in electric fields directed from the pixel electrodes 64 in the drum 81 toward the pixel electrodes 64 in the drum 82 move, respectively, to the upper side, as shown in FIG. 7, inside the main capsule bodies 25 due to those electric fields, and, due to those charged particles 27, the color of the display surface 20 of the electronic paper 2 corresponding thereto turns white.

Furthermore, in order to erase display patterns from the electronic paper 2, and make the entire surface thereof white, all of the pixel electrodes 64 on the drum 81 are successively given a positive charge, and, simultaneously therewith, all of the pixel electrodes 64 on the drum 82 are successively given a zero or negative charge. Thereby, at the places where the pixel electrodes 64 on the drum 81 and the pixel electrodes 64 on the drum 82 are in opposition, electric fields are formed which are directed from the pixel electrodes 64 on the drum 81 toward the pixel electrodes 64 on the drum 82, and the entire display surface 20 of the electronic paper 2 is made white.

Conversely, to make the entire display surface 20 of the electronic paper 2 blue, the electric fields are formed in a direction opposite to that described above, that is, electric fields are formed that are directed from the pixel electrodes 64 in the drum 82 toward the pixel electrodes 64 in the drum 81.

As described in the foregoing, by implementing this electronic paper printer 1, prescribed display patterns can be described on the electronic paper 2, properly, definitely, and repeatedly, as with the electronic paper printer 1 in the first embodiment described earlier.

Moreover, with this electronic paper printer 1, the electronic paper 2 can be overwritten, wherefore, an erasing head is unnecessary, so that the structure can simplified.

Next, a fourth embodiment of the electronic paper printer of the present invention is described.

Figure 13:
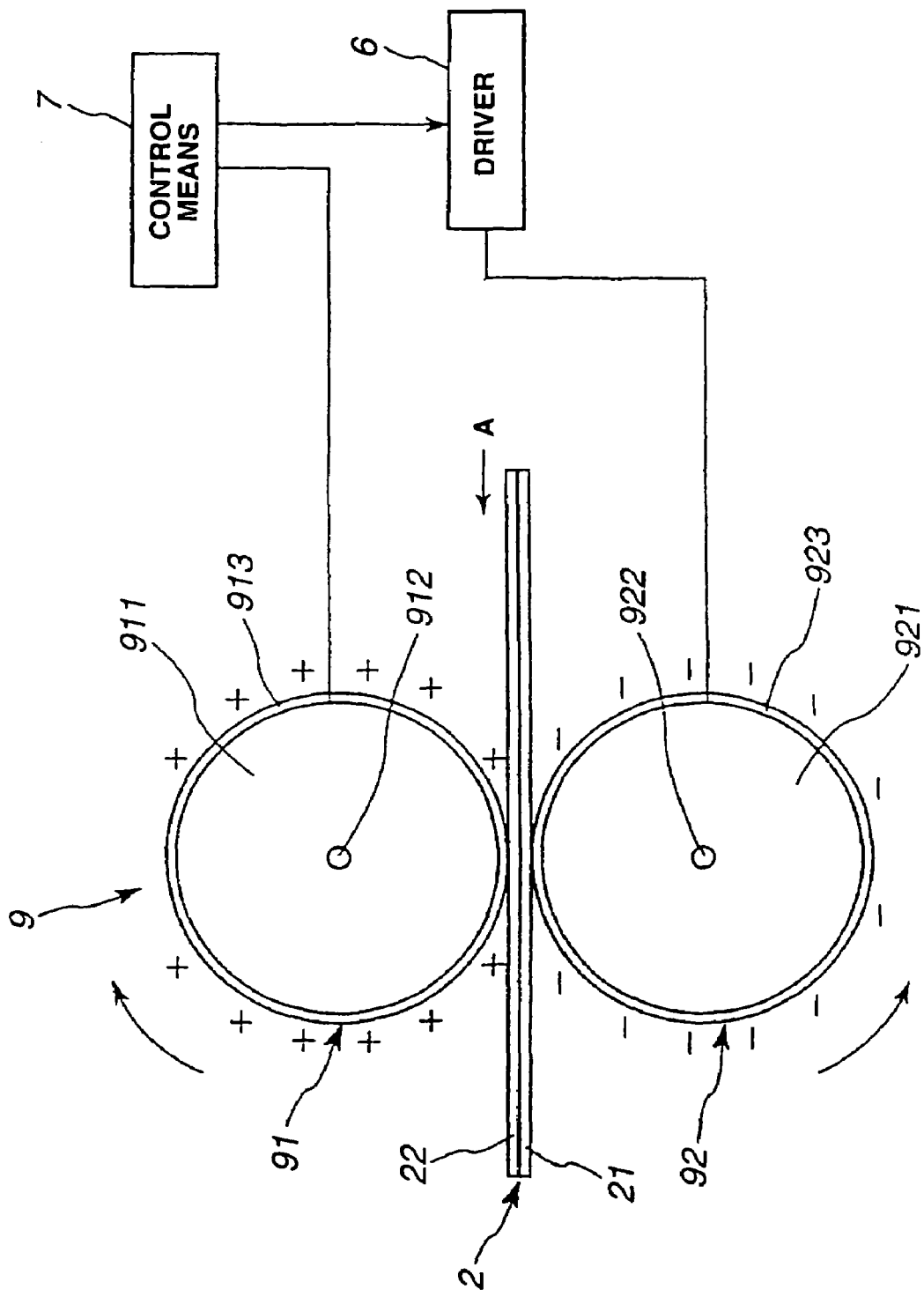
FIG. 13 is a side elevation representing a fourth embodiment of the electronic paper printer of the present invention.

FIG. 13 is a side elevation representing the fourth embodiment of the electronic paper printer of the present invention.

The electronic paper printer 1 in this fourth embodiment is a electronic paper printer that comprises an overwrite-capable describing head 9. The structure thereof is identical to that of the electronic paper printer 1 in the third embodiment, excepting in that the electrode structure on the drum 92 in the describing head 9 differs from the electrode structure on the drum 52 of the describing head 5 in the electronic paper printer 1 in the third embodiment. Accordingly, no further description is given here of the points in common with the electronic paper printer 1 in the third embodiment, but the main points of difference are described.

As diagrammed in FIG. 13, in the describing head 9 of the electronic paper printer 1 in this fourth embodiment, the drum 91 [components], that is, a drum body 911, a turning shaft 912 and circuit board 913, a drum body 921, and a turning shaft 922, respectively, are the same as those [corresponding components] in the third embodiment.

More specifically, the circuit board 913, comprising a plurality of pixel electrodes (upper electrodes), is deployed on the outer circumferential surface of the drum body 911 of the drum 91.

On the outer circumferential surface of the drum body 921 of the drum 92, however, a common electrode (lower electrode) 923 is deployed.

Accordingly, in terms of one pixel in the describing head 9, the side elevation representing the action when an electric field is formed between a pixel electrode and the common electrode 923, and a display pattern on the electronic paper 2 is overwritten, is as given in either FIG. 5 or FIG. 6.

Next, the action of the electronic paper printer 1 in the fourth embodiment is briefly described.

With this electronic paper printer 1, when describing a display pattern on the electronic paper 2, the control means 7, based on signals indicating the display pattern (such as image signals, for example), turn on prescribed thin film transistors 65 on the drum 91, via the gate driver 62 and the source driver 63 for the drum 91, apply a prescribed voltage (potential) to the sources thereof, and hold (set) the voltage (potential) on the common electrode 923 of the drum 92 to a prescribed value. Thereby, two electric fields are selectively formed, having differing directions, between the pixel electrodes 64 and the common electrode 923, and the display pattern is overwritten.

There are two methods, for example, as described next, for performing overwriting with the electronic paper printer 1 wherein the circuit board 913 is deployed only on one of the drums, namely the drum 91, as diagrammed in FIG. 13. Overwriting methods 1 and 2 are now described.

<Method 1>

Figure 14:
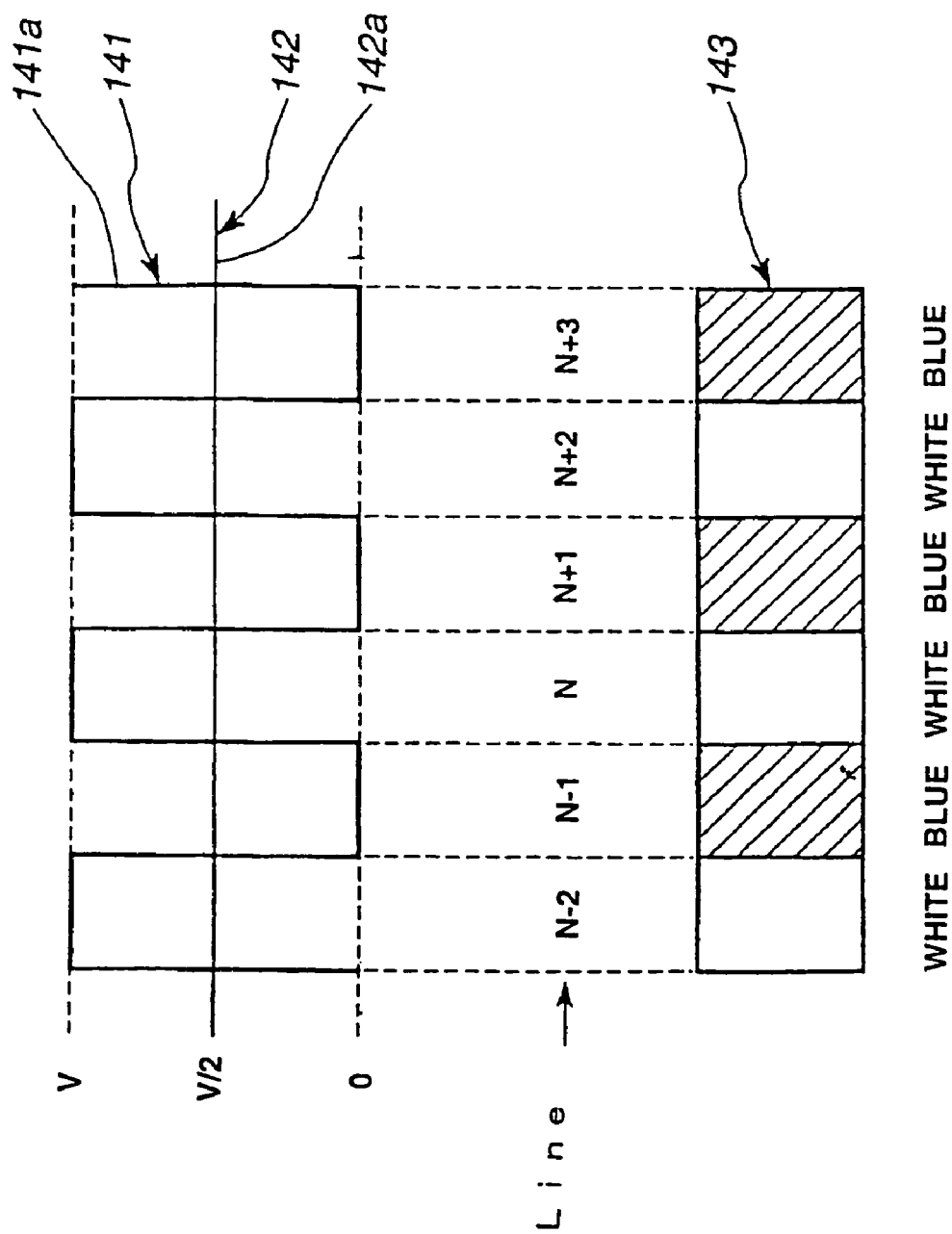
FIG. 14 is a diagram (theory diagram for method 1) representing the voltage potential on the upper electrodes in drums, and a display pattern corresponding thereto, in the present invention.

FIG. 14 is a diagram (theory diagram for method 1) which represents the voltages (potentials) on the pixel electrodes 64 in the drum 91 and the common electrode 923 in the drum 92, together with a display pattern corresponding thereto. Method 1 (i.e. the action of the electronic paper printer 1) is now described with reference to FIG. 14.

With this method, to effect overwriting on the electronic paper 2, the voltage 142 on the common electrode 923 is set to a value intermediate between the maximum and minimum values of the voltage 141 on the pixel electrodes 64 (intermediate value=constant value). More specifically, in the case where the voltage 141 on the pixel electrodes 64 varies from 0 to V volts (case where maximum value=V volts and minimum value=0 volts), the voltage 142 on the common electrode 142 is set at V/2 volts.

An example is now described.

When the display pattern 143 diagrammed in FIG. 14, for example, is to be described in a specific row on the electronic paper 2, and the gates of the thin film transistors 65 in the row corresponding to that row are turned on, the voltages indicated by the voltage pattern 141a are applied to the sources of those thin film transistors 65, that is, voltages of either 0 or V volts are applied. When that is done, the voltage 142 on the common electrode 923 is set to the voltage indicated by the voltage pattern 142a, that is, to V/2 volts.

When this is done, in the (N−2) column, for example, the voltage 141 on the pixel electrodes 64 is V volts and the voltage 142 on the common electrode 923 is V/2 volts. Therefore, electric fields are formed which are directed from the pixel electrodes 64 to the common electrode 923, and the charged particles 27 in the electronic paper 2 move, respectively, to the upper side, as shown in FIG. 13, inside the main capsule bodies 25, whereupon the color of the display surface 20 of the electronic paper 2 is made white.

Conversely, at the (N−1) column, the voltage 141 on the pixel electrodes 64 is 0 volts and the voltage on the common electrode 923 is V/2 volts, wherefore electric fields are formed that are directed from the common electrode 923 toward the pixel electrodes 64, and the charged particles 27 in the electronic paper 2 move, respectively, to the lower side, as shown in FIG. 13, inside the main capsule bodies 25, whereupon the color of the display surface 20 of the electronic paper 2 turns blue.

Thereafter, in like manner, the direction of the electric fields formed between the pixel electrodes 64 and the common electrode 923, which is to say the color of the electronic paper 2, will be determined according to the voltages 141 on the pixel electrodes 64 for the Nth column to the (N+3) column, and the display pattern 143 can be described in the prescribed rows on the electronic paper 2.

In this manner, the colors in prescribed locations (pixels) on the display surface 20 of the electronic paper 2 are determined solely by the voltages 141 on the pixel electrodes 64, on a one-to-one basis. Therefore, irrespective of what color the display surface 20 of the electronic paper 2 was before (prior to description), display patterns can be described on that electronic paper 2 merely with a single passage of the electronic paper 2 between the drum 91 and the drum 92 in the describing head 9 (i.e. a white and blue pattern is determined on a one-to-one basis). In other words, display patterns on the electronic paper 2 can be overwritten.

<Method 2>

Figure 15:
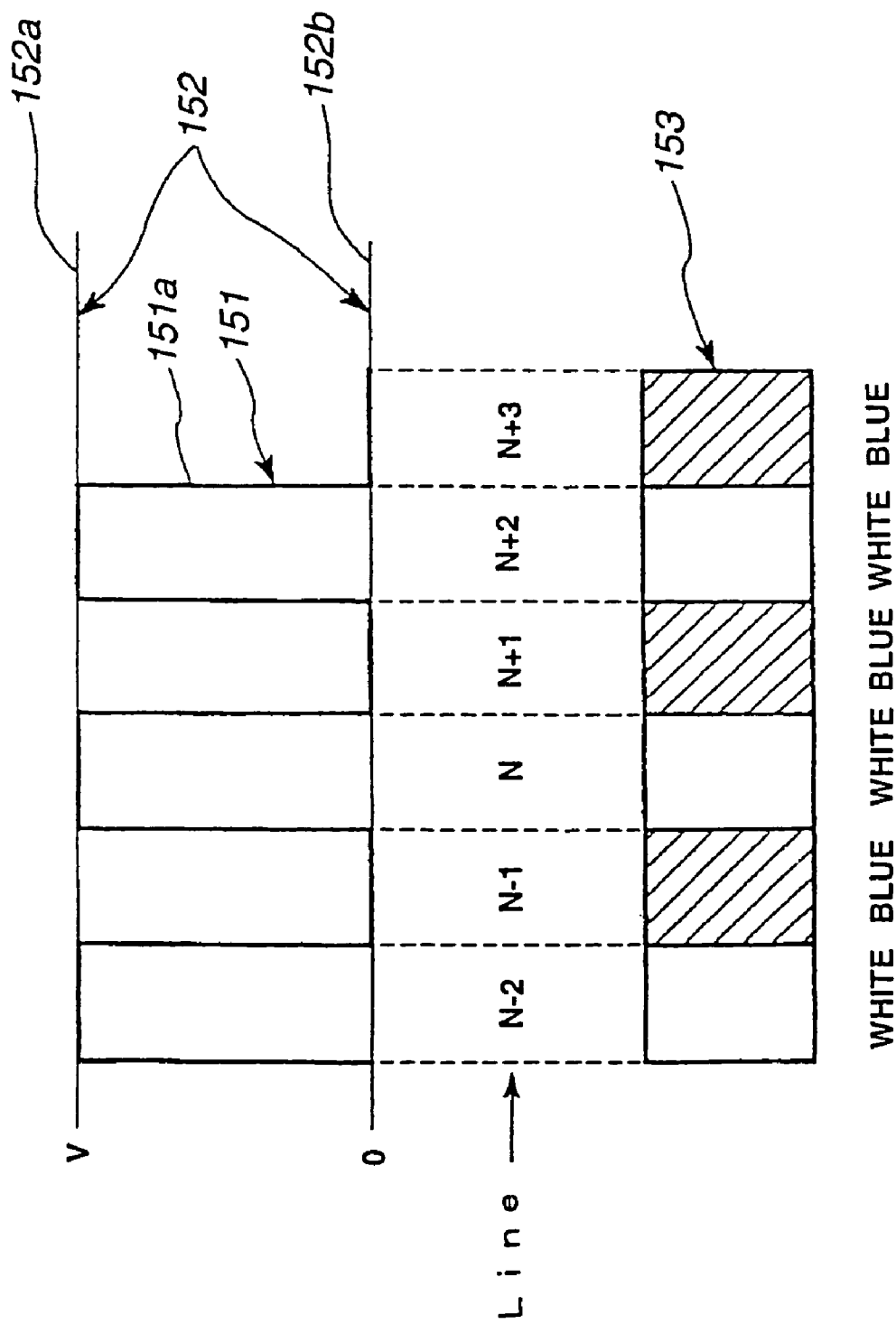
FIG. 15 is a diagram (theory diagram for method 2) representing the voltage potential on the upper electrodes in drums, and a display pattern corresponding thereto, in the present invention.

FIG. 15 is a diagram (theory diagram for method 2) which represents the voltages (potentials) on the pixel electrodes 64 in the drum 91 and the common electrode 923 in the drum 92, together with a display pattern corresponding thereto. Method 2 (i.e. the action of the electronic paper printer 1) is now described with reference to FIG. 15.

With this method, to effect overwriting on the electronic paper 2, the voltage 152 on the common electrode 923 is fluctuated between the maximum value of the voltage 151 on the pixel electrodes 64 (V volts in FIG. 15) and the minimum value thereof (0 volts in FIG. 15) (common potential oscillation). That is, when a one-row description is to be made in a desired row on the electronic paper 2, during the time that the gates of the thin film transistors 65 in the row corresponding to that row are turned on, the voltage 152 on the common electrode 923 is switched, either from V volts to 0 volts, or from 0 volts to V volts (setting to V volts and 0 volts on a time-division basis).

Furthermore, the turning drive for the drums 91 and 92 is made a step drive, that is, description is performed while turning the drums 91 and 92 in steps.

An example is now described.

When the display pattern 153 diagrammed in FIG. 15, for example, is to be described in a specific row on the electronic paper 2, and the gates of the thin film transistors 65 in the row corresponding to that row are turned on, the voltages indicated by the voltage pattern 151a are applied to the sources of those thin film transistors 65, that is, voltages of either 0 or V volts are applied. When that is done, the voltage 152 on the common electrode 923 is held at the voltage indicated by the voltage pattern 152a, that is, to V volts, for a prescribed time, and then, when the gates of the thin film transistors 65 noted above continue to be turned on, [the voltage 152] is switched to the voltage indicated by the voltage pattern 152b, that is, to 0 volts, and held for a prescribed time.

When this is done, when the voltage 152 on the common electrode 64 is V volts, effective electric fields are formed, in the area indicated in FIG. 15, only between the common electrode 923, on the one hand, and the pixel electrodes 64 in the (N−1) column, (N+1) column, and (N+3) column, on the other. At this time, the electric fields are formed so that they are directed from the common electrode 923 toward the pixel electrodes 64. Therefore, the color of the display surface 20 of the electronic paper 2 is made blue in these portions.

Conversely, when the voltage 152 on the common electrode 64 is 0 volts, effective electric fields are formed, in the area indicated in FIG. 15, only between the common electrode 923, on the one hand, and the pixel electrodes 64 in the (N−2) column, Nth column, and (N+2) column, on the other. At this time, the electric fields are formed so that they are directed from the pixel electrodes 64 toward the common electrode 923. Therefore, the color of the display surface 20 of the electronic paper 2 is made white in these portions. Furthermore, at this time, the voltage between the common electrode 923, on the one hand, and the pixel electrodes 64 in the (N−1) column, (N+1) column, and (N+3) column, on the other, iso volts, and no electric field is formed between these electrodes, wherefore the color of the display surface 20 of the electronic paper 2 is not changed in these portions, but is kept blue.

Hence, by switching the voltage 152 on the common electrode 923 between V volts and 0 volts, the direction of the electric fields formed between the pixel electrodes 64 and the common electrode 923, that is, the color of the electronic paper 2, is determined by the voltages 151 on the pixel electrodes 64, and the display pattern 153 can be described in a prescribed row on the electronic paper 2.

In this manner, the colors in prescribed locations (pixels) on the display surface 20 of the electronic paper 2 are determined solely by the voltages 151 on the pixel electrodes 64, on a one-to-one basis. Therefore, irrespective of what color the display surface 20 of the electronic paper 2 was before (prior to description), display patterns can be described on that electronic paper 2 merely with a single passage of the electronic paper 2 between the drum 91 and the drum 92 in the describing head 9 (i.e. a white and blue pattern is determined on a one-to-one basis). In other words, display patterns on the electronic paper 2 can be overwritten.

With method 2, the action becomes more complex than with method 1, but the voltage that can be applied is twice that of method 1, which is advantageous for high-speed or high-contrast describing.

In the foregoing, the electronic paper printer of the present invention has been described on the basis of the embodiments diagrammed in the drawings, but the present invention is not limited thereto or thereby, and the configurations of the components therein can be replaced by any configurations that have equivalent functions.

Figure 16:
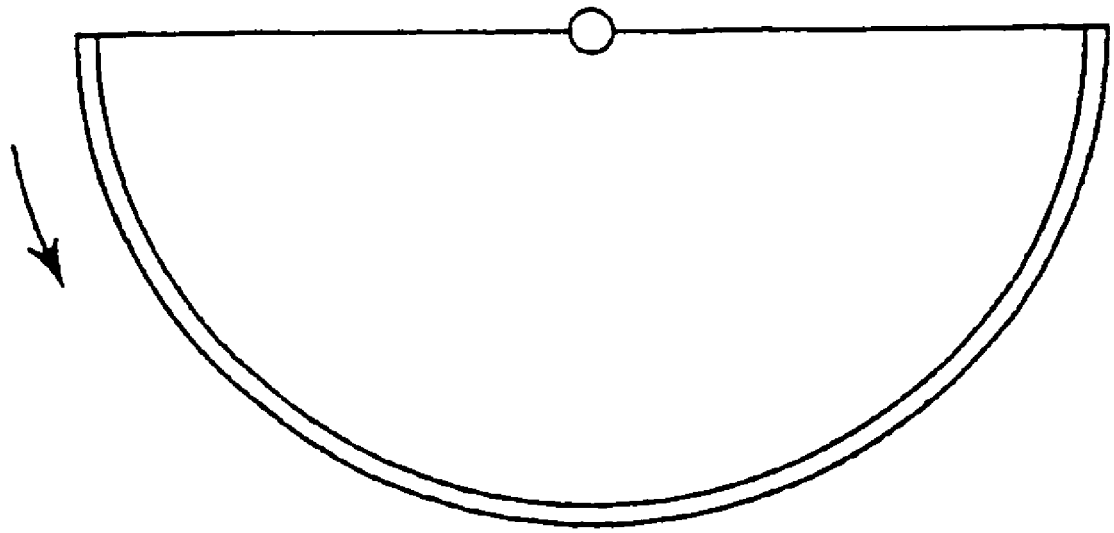
FIG. 16 is a side elevation representing another example configuration of a head in the present invention.

In the embodiments described in the foregoing, for example, the shape of the drums is cylindrical, but the drum shape is not limited thereto in the present invention, but may, for example, be shaped as a half drum as diagrammed in FIG. 16. In the present invention, in other words, it is only necessary that the portion or portions of the head that come into contact with the electronic paper be shaped as a curved surface (i.e. that the electrode or electrodes be shaped as curved surfaces).

When the drums are shaped as half drums, as diagrammed in FIG. 16, miniaturization of the apparatus is facilitated.

As described in the foregoing, by implementing the electronic paper printer of the present invention, prescribed display patterns such as text characters, numbers, and graphics (pictures) can be repeatedly described on electronic paper.

With the present invention, in particular, the portions of the heads that contact the electronic paper are shaped as curved surfaces (with the shape of the drums in the heads being cylindrical or half-drums, for example), wherefore display patterns can be described properly and definitely on the electronic paper.

What is claimed is:

1. An electronic paper system for describing display patterns on electronic paper, comprising:

a pair of drum shaped writing heads for describing display patterns on said electronic paper, both of said writing heads having a plurality of pixel electrodes which are independently actuated to form electronic fields and said pixel electrodes of each writing head are arranged so as to correspond to each other; and controlling means for applying voltage for display patterns to both corresponding pixel electrodes of each writing head so as to directly overwrite the display pattern on said electronic paper.

2. The electronic paper printing system according to claim 1 wherein said plurality of pixel electrodes is deployed in a matrix arrangement.

3. The electronic paper printing system according to claim 2 wherein said plurality of pixel electrodes have a plurality of switching elements that can switch between forming and extinguishing the electronic fields produced by the plurality of pixel electrodes.

4. The electronic paper system according to claim 3 wherein said switching elements comprise thin film transistors.

5. An electronic paper system for describing display patterns on electronic paper, the electronic paper system comprising:

a pair of drums including a first writing head and a second writing head that describe display patterns on the electronic paper, the first writing head having a plurality of first pixel electrodes and the second writing head having a plurality of second pixel electrodes, the first and second pixel electrodes being independently actuated to form electric fields; and a controlling unit that applies a voltage to the pixel electrodes of the first writing head and the pixel electrodes of the second writing head so as to directly overwrite the electronic paper, wherein the plurality of first pixel electrodes correspond to the plurality of the second pixel electrodes.

6. The electronic paper printing system according to claim 5, wherein the plurality of first and second pixel electrodes are deployed in a matrix arrangement.

7. The electronic paper printing system according to claim 6, wherein the plurality of first and second pixel electrodes have a plurality of switching elements that can switch between forming and extinguishing the electric fields produced by the plurality of first and second pixel electrodes.

8. The electronic paper system according to claim 7, wherein the switching elements comprise thin film transistors.

* * * * *